(12) United States Patent
Rada

(10) Patent No.: US 10,785,015 B1
(45) Date of Patent: Sep. 22, 2020

(54) MULTIPLE PHASE SYMBOL SYNCHRONIZATION FOR AMPLIFIER SAMPLER ACCEPTING MODULATED SIGNAL

(71) Applicant: Keyssa Systems, Inc., Campbell, CA (US)

(72) Inventor: Patrick Antoine Rada, San Diego, CA (US)

(73) Assignee: Keyssa Systems, Inc., Campbell, CA (US)

( * ) Notice: Subject to any disclaimer, the term of this patent is extended or adjusted under 35 U.S.C. 154(b) by 0 days.

(21) Appl. No.: 16/399,850

(22) Filed: Apr. 30, 2019

(51) Int. Cl.
*H04L 7/00* (2006.01)
*H04L 25/03* (2006.01)
*H04L 7/033* (2006.01)

(52) U.S. Cl.
CPC .......... *H04L 7/0087* (2013.01); *H04L 7/0331* (2013.01); *H04L 25/03057* (2013.01)

(58) Field of Classification Search
CPC  H04L 7/0087; H04L 7/0331; H04L 25/03057
USPC ....................................................... 375/232
See application file for complete search history.

(56) References Cited

U.S. PATENT DOCUMENTS

| | | | |
|---|---|---|---|
| 2009/0110033 A1* | 4/2009 | Shattil | H04B 1/7174 375/141 |
| 2014/0062574 A1* | 3/2014 | Sorrells | H03G 3/3042 327/355 |
| 2014/0233619 A1* | 8/2014 | Sindalovsky | H04L 1/201 375/224 |
| 2014/0286381 A1* | 9/2014 | Shibasaki | H03L 7/089 375/226 |
| 2018/0083638 A1* | 3/2018 | Tajalli | H03L 7/087 |
| 2019/0280849 A1* | 9/2019 | Schuh | H04L 7/0087 |

* cited by examiner

*Primary Examiner* — Hirdepal Singh
(74) *Attorney, Agent, or Firm* — Fish & Richardson P.C.

(57) ABSTRACT

Methods, systems, and apparatus for EM communications. One of the apparatus includes a plurality of receive samplers arranged in parallel and configured to receive an amplitude modulated input signal, each sampler being clocked at a same rate but not a same phase, the rate being in relation with the input signal; a plurality of envelope extractors, wherein each envelop extractor is communicatively coupled to a respective output of one of the plurality of receive samplers, and wherein each envelope extractor is configured to extract the envelope of the input signal after sampling; and a combiner communicatively coupled to the envelope extractors to combine the signal envelopes sampled at their respective phases, creating a combined output that provides an approximate copy of the input signal envelope, providing an output signal for performing symbol synchronization.

20 Claims, 10 Drawing Sheets

MULTIPLE PHASE SYMBOL SYNCHRONIZATION FOR AMPLIFIER SAMPLER ACCEPTING MODULATED SIGNAL

BACKGROUND

This specification relates to electromagnetic and high speed wired communications.

Advances in semiconductor manufacturing and circuit design technologies have enabled the development and production of integrated circuits (ICs) with increasingly higher operational frequencies and higher data rates. In turn, electronic products and systems incorporating high frequency integrated circuits are able to provide greater functionality than previous generations of products. The additional functionality has typically included the processing of increasingly larger amounts of data at increasingly higher speeds.

Radio transmitters and receivers include many functions and, in particular, one very important and difficult function is the synchronization of received data symbols. It has been a challenging part of conventional communication systems in term of complexity, power consumption, setup time and performance. The matter has been abundantly studied in the academic and industrial circles for conventional radio systems. The difficulty is exacerbated when the carrier frequency is increased to very high frequency such as millimeter wave at 60 GHz or 120 GHz, the symbol rate is increased to multiple GHz with binary data rate in excess of 1 Gbps, or when the ratio of symbol rate vs. the carrier frequency increases to a level of a few percent.

In conventional high-speed communication systems with amplitude modulation, the received signal after amplification may be demodulated in an asynchronous or synchronous fashion vs. the transmit carrier frequency. After the demodulation and filtering processes, the signal can feed directly to a Clock-Data Recovery block (CDR) which amongst other functions, locks to the phase and frequency of the incoming data symbols and provides the output receive signal and regenerated clock.

Another class of receivers uses amplifiers with high frequency sampling to process the modulated signal. This class of receiver may have numerous advantages such as high gain, medium to low power consumption, lower jitter and lower noise figure. However, since the sampling is clocked by a receive local oscillator and not by the transmitter, the symbol transitions (and symbol synchronism in phase and frequency) may be lost or hidden after demodulation and filtering.

Super-regenerative amplifiers belong to this class and are fundamentally time-variant amplifiers with periodic sampling (or clocking). In the scenario of a receive sampling clock substantially close to the incoming symbol rate, e.g. 1.15 GHz vs. 1.0 GHz, the symbol transition information is lost and the CDR may not be able to synchronize on the incoming symbols. On the other side (over-sampling), if the sampling clock is N times faster than the incoming symbol rate, the signal envelope can be recovered with some excess jitter. However, when the symbol rate is already extremely fast, it may be very challenging or unpractical to produce a clock rate N-time faster than the data rate and process data symbol N-time faster.

In another realistic configuration (under-sampling), the symbol rate must be reduced by a factor N to be able to process the high speed received data, demodulate and synchronize with the incoming data symbols. The Nyquist theorem states that N≥2. With an implementable value of N equal to 3, the maximum symbol rate that can be sustained is cut in three, a major drawback. For example, if the carrier frequency is 60 GHz, the modulation is binary, the symbol rate is 5 Gbps, the maximum sampling rate is 7 GHz, a conventional receiver may be able process that 5 Gbps data rate. On the other side, a sampled receiver wouldn't be able to process 5 Gbps and the max. sustainable data rate would be reduced to 5 Gbps/2.5=2.0 Gbps with N=2.5.

Conventional systems do not provide a solution for sampled receivers able to process very high symbol rate and high carrier frequency that enable, at the same time, their specific advantages plus the ability to process the highest incoming symbol rate at a sampling rate substantially close to the symbol rate and not a multiple of it.

SUMMARY

Radio transmitters and receivers include many functions and synchronization of received data symbols is of paramount importance. The problem is exacerbated when the frequency increases, the data rate increases, and/or the ratio of data rate vs. the carrier frequency increases to a level of a few percent. For instance, with the Wi-Fi standard 802.11b, the data rate at the lowest rate mode i.e. binary modulation BPSK is 1 Mbps while the carrier frequency is 2.412 GHz at channel 1; This gives a ratio of data rate vs. carrier frequency of 415 ppm. In comparison and in a second example, WiGig 802.11ad could theoretically provide 1.76 Gbps in BPSK single carrier mode at channel 2=60.48 GHz (if there were no coding) thus a much higher ratio of 2.91%.

In a third example, a 5 Gbps binary ASK single carrier receiver at 60 GHz provides a ratio as high as 8.3% that provides only 60 GHz/5 Gbps=12 periods maximum of the carrier per each symbol. This renders the demodulation and symbol synchronization more difficult because the short time to form a demodulated symbol. Additionally, the symbol synchronization must be very fast to synchronize and track the incoming receive signal.

In conventional high-speed communication systems with amplitude modulation, the received signal after amplification may be demodulated in an asynchronous or synchronous fashion (vs. the transmit carrier phase and frequency). Asynchronous is simpler vs. synchronous as no receive local oscillator is required. Also, it is generally insensitive to the transmit frequency carrier accuracy or variation with temperature. However, the signal to noise ratio is reduced by 3 dB and the solution targets only a single communication channel. After the demodulation and filtering processes, the signal can feed directly to a Clock-Data Recovery block (CDR) which locks to the phase and frequency of the incoming data symbols and provides the output receive signal. Since the CDR synchronizes to the frequency of the incoming data symbols it may be called a synchronizer.

Another class of receivers uses amplifiers with high frequency sampling to process the modulated signal. After demodulation and filtering, the symbols changes may be lost due the sampling provided by a local receive clock.

Super-regenerative amplifiers belong to this class and are fundamentally time-variant amplifiers with periodic sampling. At first, as the sampling is synchronized to the receive clock generator and not to the incoming symbol clock in the transmitter, the CDR after demodulation and filtering is not able to lock to the incoming data as it would with a fix gain amplifier without sampling.

One way to solve this problem of lost information is to oversample the incoming data by a factor N. The Nyquist theorem tells us that at least twice and practically more than two times the data rate is needed, e.g. 2.2× to 3×. For instance, for a data rate of 10 Gbps, a carrier frequency of 60 GHz and an oversampling factor of 3, the incoming data are sampled 3 times per symbol and the change of symbol can be unhidden given a time jitter of maximum ⅓ of symbol (assuming no jitter in the transmit data flow). In this scenario, the clock frequency of the sampler needs to be 3 times higher than 10 Gbps i.e. 30 GSps. The demodulated signal must be completely formed within ⅓ of the data clock to be able to process the symbol rate (not N times faster), which is difficult when the technology is pushed to the limits of the IC node capabilities. For high data rate communication systems, it is not practical to oversample multiple times an already very fast data symbol.

Another symbol synchronization method for sampled receivers is to sample several times each receive data symbol at substantially the same data clock rate but with different phases, for instance at a relative time of 1/4, 1/2, 3/4, and 4/4 of each incoming symbol. Expressed in phase delay vs. 1 symbol that is 1 UI, and following this example, the clock phases become 360/4=90 degrees, 360/2=180 degrees, (3/4) 360=270 degrees and 360 degrees. As the receive clock is not synchronized with the incoming data symbol, the sampling outputs continuously slides in relation of the incoming symbols (rotates in a I/Q diagram) since the receive and transmit clocks are not synchronized. In that example, four copies of the demodulated signal delayed in time are created and may collectively indicate where the symbol transition may be.

In some implementations, M parallel sampling circuits are deployed and a total of N samples per symbol are taken with equidistant clock phases (same phase separation between all samplers) with respective values of 0 degree, 360/N degree, 2 (360/N) degrees, . . . , and (N−1) (360/N) degrees. When M=N, the sampling becomes cyclic to infinity since the $1^{st}$ sampler samples with a phase delayed by exactly 360 degrees its previous one, which is the same position of the trigonometric circle when the circle is referred to one symbol long (=360 degrees). In other words, the sampler clock phase for each sampler is repeated every 360 degrees. This is a circular and symmetrical sampling that optimizes the collective information provided by all the samplers outputs.

In one implementation, 3 parallel sampling circuits are deployed and a total of 3 samples per symbol are taken with clock phase of 0 degree, 120 degrees and 240 degrees. As stated before the sampling is cyclic to infinity and repeat at L times the same phase in a trigonometric circle. In other words, the first sampler clock is 0, 360, 720, 1080 degrees, etc. Second sampler is 120, 480, 840 degrees, etc. while the third sampler is clocked at 240, 600, 960 degrees, etc. If 120 degrees is added to the clock of the third sampler we get the value of the first sampler clock one data symbol later. This is a circular and symmetrical sampling that optimizes the information provided and keep the same sampling phase difference continuously. An example of tri-phase cyclic clock generation is described below with respect to FIG. 5, trace 503.

In addition, the combining of the N sampler signal contributions (in a N phase system) creates an approximate copy of the incoming signal that carries the information of the data symbol by virtue of cyclical averaging symmetry.

Continuing with this above implementation, the number of samplers is 3, and the sampler clocks are separated by 120 degrees. This leads to the minimum number of samplers that provides a cyclic behavior and comply with Nyquist. This is an optimal and most economical symbol synchronization topology for sampled receivers.

The subject matter described in this specification can be implemented in particular embodiments so as to realize one or more of the following advantages: Solving the problem of lost symbol transition in a sampled receiver due to unsynchronized sampling local clock when N<2. Also permitting the sampling at full symbol rate with clock and sampling rate not exceeding the symbol rate. The applications may be multiple such as in communication at a very fast data rate, high frequency, or with high ratio of symbol rate vs. carrier frequency such as radio frequency, gigabit contactless communications, gigabit radio communication, gigabit wired communication, gigabit fiber optic communication, gigabit coaxial cable communication, etc.

The details of one or more embodiments of the invention are set forth in the accompanying drawings and the description below. Other features, objects, and advantages of the invention will be apparent from the description and drawings, and from the claims.

DETAILED DESCRIPTION

This specification describes techniques for sampling modulated incoming data symbols at full symbol rate without the need of oversampling at double rate or higher.

In sampled receivers, the sampling clock is generated locally and is not synchronous with the one of the transmitters. For scenarios where the oversampling N<2, this causes the hiding of symbol transitions and generates a receive signal that cannot be resolved by a CDR.

This problem can be solved by using multiple samplers in parallel sampled at a clock frequency substantially close to the one of the incoming symbol rate but with a different phase on each sampler.

In some implementations, the number of samplers is N and the sampling clocks for each receive sampler delayed by a phase of M degrees.

In particular, one implementation of N samplers is created when M=360/N degrees and all clock phases are distributed in a phase-equidistant fashion. This provides a N-phase sampling configuration with a symmetrical cyclic configuration. When combining the N sampler outputs after envelope detection and filtering, the averaging provides an approximate copy of the incoming receive signal that can be processed by a CDR.

Furthermore, after that the CDR is locked onto the symbol rate in frequency and phase, the sampler multiphase clocks can be switched from the local receive clock to a multiphase clock generated by the CDR itself therefore making the synchronization between the transmitter and receiver signals stronger and possibly reducing the output signal jitter. Since the CDR synchronizes to the frequency of the incoming data symbols it may be called a synchronizer.

In some implementations, the number of samplers is 3 and the sampling clocks for each receive sampler delayed by 360/3=120 degree in order to create a 3-phase sampling configuration that provides a symmetrical cyclic configuration. By the same token, when combining the 3 sampler outputs after envelope detection and filtering, the averaging provides an approximate copy of the incoming receive signal that can be processed by a CDR. Furthermore, and as described, the sampler clocks can be switched from a local receive multi-phase clock oscillator to the CDR itself after the CDR has locked onto the phase/frequency of the incoming receive data symbols and provides valid data and multiphase clocks with benefit of having a stronger synchronization with the transmitter signal and possibly reducing the output signal jitter.

Figure 1:
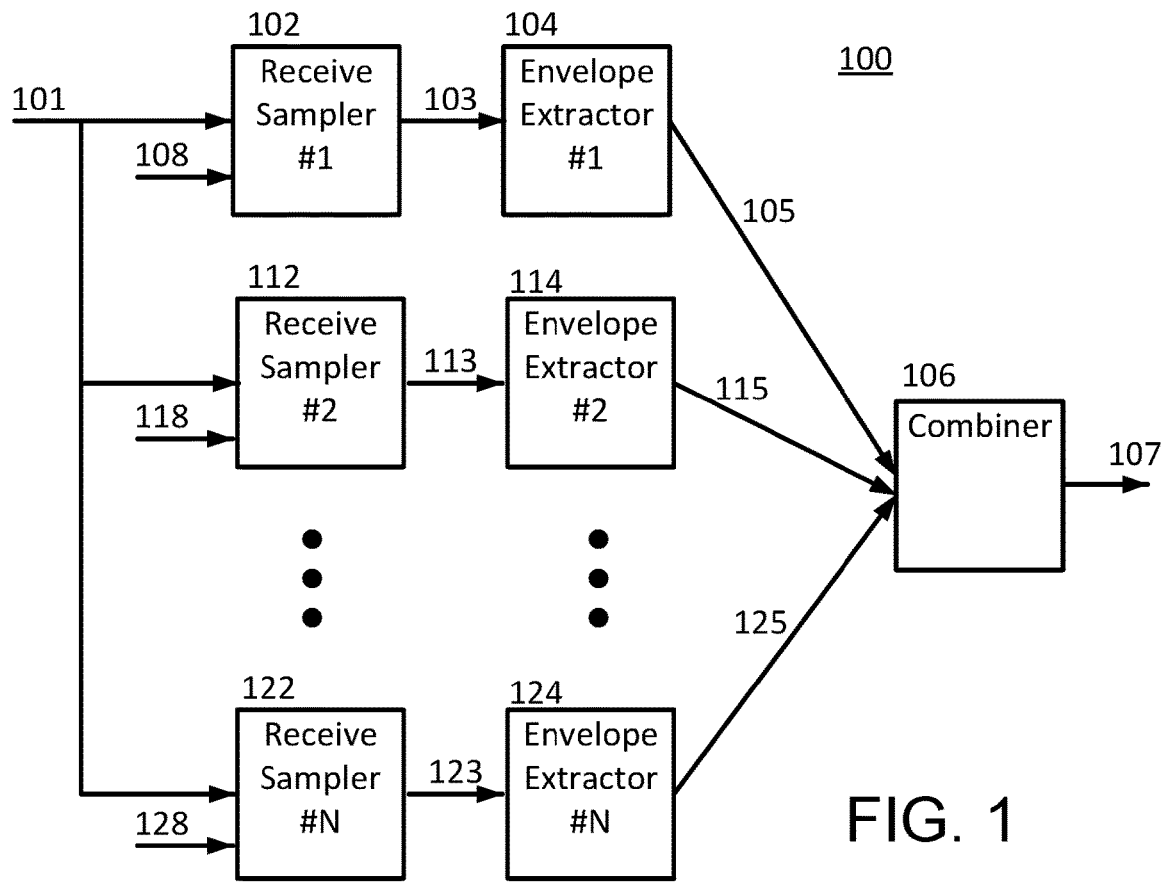
FIG. 1 is a block diagram of an example multiple receive samplers apparatus providing a signal for performing symbol synchronization.

FIG. 1 is a block diagram of an example apparatus 100 including multiple receive samplers providing a signal for performing symbol synchronization. The input amplitude modulated received signal 101 feeds the N receive samplers 102, 112, and 122. If 101 is a radio signal an isolator (not shown) may be included in between the input and the N samplers to isolate the receive samplers input to reflections that can provide from the previous receive block such as an antenna (not shown).

A sampler clock 108, 118, and 128 inputs to each receive sampler 102, 112, and 122. The receive sampler output 103, 113, and 123 is followed, respectively, by an envelope extractor 104, 114, and 124 that demodulates the amplitude modulated signal. An envelope extractor is an envelope detector. A typical envelope detector is an absolute value function or square function and can be implemented with a diode and capacitor, or with a self-product block function, or with a rectifier. Not shown in 100, each envelop extractor may be followed by a low pass filter to suppress mostly the second harmonic of the input carrier frequency and other high frequency terms.

Baseband signals 105, 115, and 125 output from the respective envelope extractors collectively contain the information of symbol transition but must be fed to and processed in a combiner 106 in order to create a useful signal. The output signal 107 of the combiner 106 recreates an approximate copy of the incoming signal, before sampling, similar to 101 except that in many scenarios, the magnitude of 107 is greater than 101 due to signal amplification in the receive samplers 102, 112, and 122. The copy follows the symbol rate and the amplitude ripple is related to the time quantization sampling: If the number of samplers N is large, say 10, the approximation of the input amplitude signal is much more accurate and has less ripple vs. a limited of number of samplers for instance 3. On the other side, the complexity is greater. In an economical implementation the number of samplers can be kept to a minimum value while the signal 107 may be improved before feeding the CDR with processing such as filtering and equalization.

Coming back to the samplers 102, 112, and 122, and in a conventional mode, the frequency of each clock 108=FCK1, 118=FCK2, . . . , 128=FCKN is similar or substantially identical to each other FCK1=FCK2, =FCKN while their phase of each clock, PCK1, PCK2, . . . , PCKN, are not substantially identical. For instance, a 10-sampler implementation may have FCK1, FCK2, =FCKN=11 GHz, and clock phases is 0 degree for PCK1, 360/10=36 degrees for PCK2, . . . , and (10-1) 360/10=324 degrees for PCKN.

The frequency of the samplers may be related to the input signal symbol rate with a ratio R equal to the sampler clock freq. vs. the incoming symbol frequency. Reminder: As the sampler clocks are generated by a clock local to the receiver, they are not in synch with the incoming symbol rate; they may be similar unless a locking mechanism is used such as a CDR. In a generic case, R≈R1 for instance 4. In that scenario, each N sampler samples the incoming symbol about 4 times per symbol. After combining, the time quantization is better than coarse and the recreated signal 107 has less ripple due to time quantization. However, since this specification targets implementations using a very high data rate where it is difficult to sample the symbols at more than 1-1.5 time the symbol rate, this mode becomes difficult to implement and complicated.

On the other side, any value of R<2/N equates to undersampling and may require more processing or are not adequate for maximum sustained data symbol rate.

In some implementations, the relation is R≈1. In this scenario, there are N signal created 105, 115, . . . , 125, sampled at about the same rate vs. the symbol rate and combined with a different phase in the combiner 106. As the sampler frequency FCK is not exactly the same as the incoming symbol rate FS, a frequency beat FB is created which is equal to the absolute value of the difference between FS and FCK and makes the sampling slide relatively to the incoming symbol position. If the phase difference between each sampler clock is the same and the sum of the phase difference amongst all sampler clocks is 360 degrees, then the sampling is cyclic and the averaging at the combiner reconstructs a valid signal 107. However, as FB is not zero, there will be a constant rate of sliding. This is overcome and the symbol information of the output signal 107 stays consistent (symbol rate synced up in phase and frequency) with the signal 101. In theory, the jiggle or jitter caused by the combining and the non-zero beat frequency is very low. In a realistic implementation, the contribution of excess jitter may be due to 1) frequency band limiting in the signal, transmitter, channel and receiver, 2) sliding averaging effect due the combining 106, 3) receive sampler clock phase noise, and 4) jitter already present in the transmit symbol data rate. See FIG. 8 for an example 4-ASK modulation.

One or more implementations use three receive samplers, e.g., samplers 102, 112, and 122, each fed by the same clock but each with respective phase of 0 degree (108), 120 degrees (118) and 240 degrees (128); and the sampling clock frequency 108, 118, 128 are similar to the incoming symbol rate, R≈1. This create a tri-phase configuration apparatus with minimal complication that processes high data rate with a similar sampling rate and guaranteed symbol synchronization operation due to the cyclic averaging. Furthermore, the output signal 107 can feed a CDR directly or through filtering and equalization.

Figure 2A:
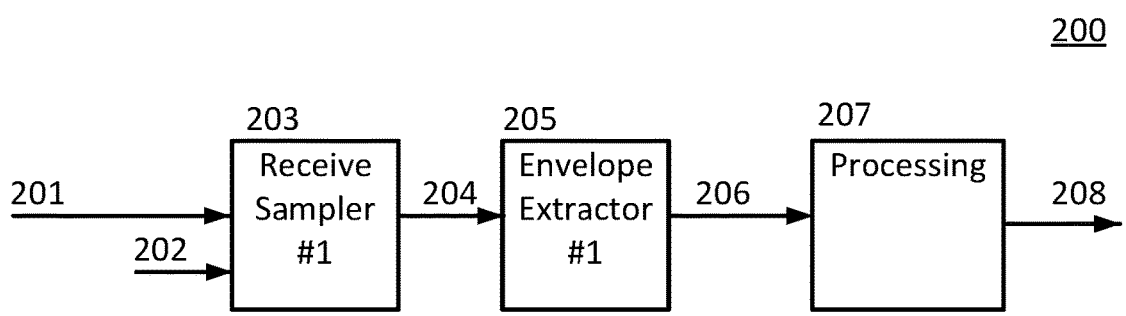
FIG. 2A is a block diagram of an example receiver including oversampling of the input signal and symbol synchronization.

In contrast with 100 in FIG. 1, FIG. 2A is a block diagram of an example receiver 200 including oversampling of the input signal and symbol synchronization. The input amplitude modulated received signal 201 and the sampler clock 202 input feed a receive sampler 203. If 201 is a radio signal, an isolator (not shown) may be inserted in between the input 201 and the sampler input 203, for example, to avoid reflections at the input with an antenna. The receive sampler output 204 is followed by an envelope extractor 205 that demodulates the amplitude modulated signal. As described above with respect to FIG. 1, an envelope extractor is an envelope detector. The envelop extractor output 206 feeds a processing block 207 that may include amongst other, filtering, equalization, slicing, and sampling. Its output 208 is a signal that can feed directly a CDR (not shown).

This example receiver provides useful symbol synchronization only if the sampling rate 202 of the receive sampler 203 is R times higher that the symbol rate with R>2. If R=2 the output is marginal and is not recommended to use as it may lead to reduced eye height (in the eye diagram representation), and increase bit error rate (BER). If R<2, the input signal cannot be reconstructed by virtue of Nyquist theorem.

Figure 2B:
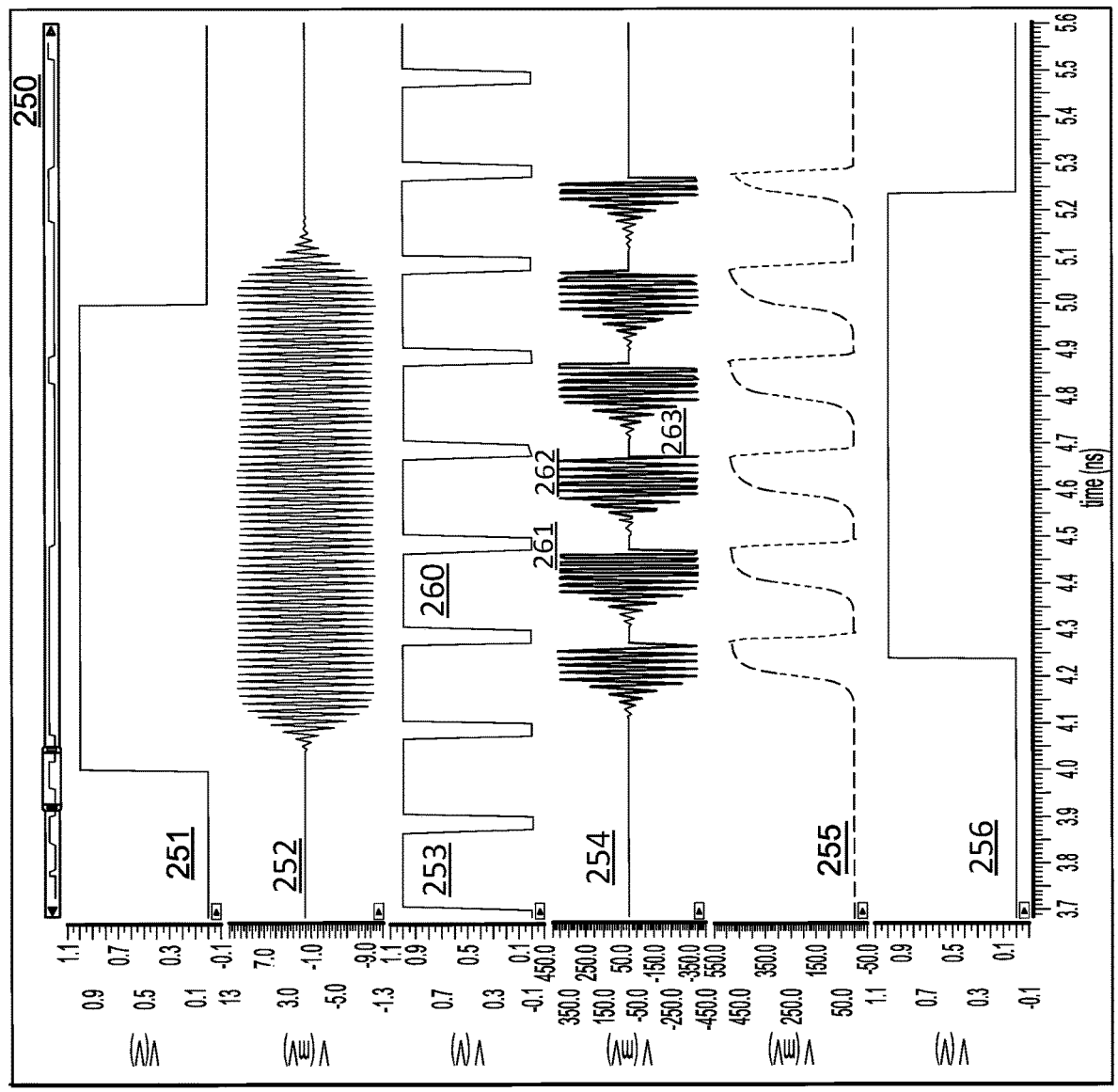
FIG. 2B is an example time response diagram of the various signals related to an oversampling circuit and symbol synchronization

FIG. 2B. is an example time response diagram 250 of the various signals related to an oversampling circuit of receiver 200 and symbol synchronization. Trace 251 shows the transmit data symbol before amplitude modulation with a successive positive and negative transition having a "0" state, a "1" state and again a "0" state. After passing through the channel, that may be air, wave guide, coaxial cable, wire, fiber optic or other medium of EM propagation, and being received it becomes trace 252, e.g., received signal 201 in FIG. 2A. Trace 252 also shows frequency band limiting since the positive and negative transitions are slower that the one of the modulation 251, due to band limiting in the transmitter, the channel and/or the receiver before 201. In other words, the signal 252 suffers from reduced rise and fall times of the envelope transitions.

Trace 253 shows the receive sampler input clock located at FIG. 2A 202 input. Assuming regeneration amplification during the high level 260 and reset during the low level 261, one can notice a regeneration duty cycle of 80% of the symbol duration and about 20% reset time 261. Trace 254 corresponds to the output 204 of the receive sampler 203 and shows one amongst multiple amplification phases 262 during the high level of the clock 260 and reset 263 during the low level of the clock at reset time 261. In this implementation, an amplification regeneration 254 is limited to +/−400 mV peak and the signal 204 trace 254 truncated to +/−400 mVp at time 262.

Trace 255 shows the signal 206 at the output of the envelope extractor 205. The signal becomes unipolar and loses its high frequency content after low pass filtering (carrier frequency oscillations). In this implementation, the oversampling ratio amounts to 5, that is 5 GSps (giga samples per second) vs. the symbol rate of 1 Gbps. Indeed, about 5 (actually 6) cycles of regenerations per symbol 251 can be counted in 255 due to the slower rise and fall times in the input signal 252 that extended slightly the signal duration of the symbol "1". After some processing on signal 206 by the function 207 the data symbols signal 208 can be recreated as plotted in 256.

An example of processing performed by the function 207 is: 1) Slicing the signal 255 with a reference voltage at middle voltage of 255 and 2) sampling the sliced signal in synchronicity with clock 202 shown as trace 253. The output of the processing is shown as trace 256 which is an approximate copy of the input 251 (similar shape with amplified magnitude and approximate equal duration with some jitter).

At the end, the signal 206 or 208 (before or after optional processing 207) is suitable to drive a CDR and creates a recover received symbol data and recovered clock, both synchronous with the incoming receive symbol data. However, as the sampling clock 202 is not synchronous in phase and frequency with the one of the input signal 201, there will be a phase jiggle a the output, that is excess jitter. A disadvantage of this method is the constant excess jitter produced by the limited oversampling R ratio. The jitter J can be estimated as J=K/(S R) with J=peak to peak jitter, K a small value in the order of 0.1 to 3, S the symbol rate and R the oversampling ratio. For instance, if K=1.2, S=10 Gbps that is 100 ps symbol time and R=5, J becomes 24 ps or 24/100=24% of 1 UI.

The jitter relative to one symbol length or 1 UI can be written as J/UI=K/R. In another example, for R=2.1 and K=1.2, the excess jitter is 1.2/2.1=57% of one UI. This high jitter is independent of the symbol rate and depends only on the oversampling ratio. Increasing the oversampling ratio R to 3 reduces the jitter to 1.2/3=40% of 1 UI. Even increasing the oversampling R to 10 decreases the excess jitter to only around 12% of 1 UI. The jitter created by unsynchronized receive-transmit clock with this oversampling method may be excessive in many high data rate applications.

Another drawback of this implementation is the requirement to sample R times faster than the already very fast symbol rate. The maximum achievable symbol rate is thereafter divided by a minimum oversampling ratio Rmin for instance 2.5. The maximum rate of receive sampler sampling clock 202 is determined by: a) the type and characteristics of the selected IC process (minimum transistor size (node), transition frequency, Fmax, power/voltage budget, max. current, etc.) for the receive sampler 203, envelop extractor 205 and processing unit 207, b) the min. achievable amplification gain during the fraction 1/R of one symbol, e.g. 2.5 times shorter than 1 UI with a ratio R=2.5, c) the min. time needed to form a valid and consistent demodulated signal, and d) processing that is able to process the information up to R time faster vs. the symbol rate. In another example, with 5 GSps max. sampling, and a 5 times oversampling ratio, the maximum symbol rate reduces drastically to 5 GSps/5=1 Gbps with a binary modulation.

This oversampling method and apparatus 200 thus limits the maximum achievable symbol rate that can be processed and is not optimized for very high symbol and sampling rates. An alternative implementation, as described below, can produce a maximum symbol rate as high or close to the receive sampler clock rate 202 shown in 253, not 2.01 to 50 times less.

Figure 3A:
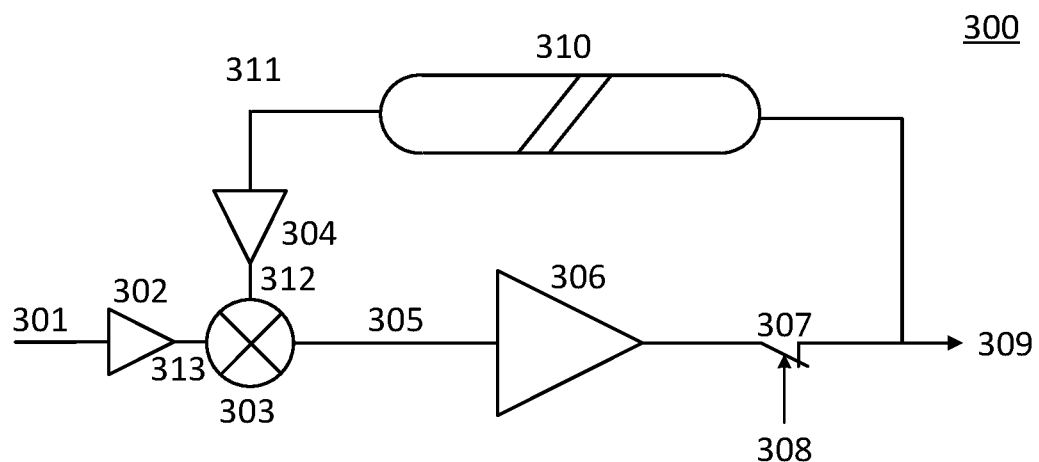
FIG. 3A is an example block diagram of an SRA

FIG. 3A. is a block diagram of an example Super Regenerative Amplifier (SRA) 300. An input signal 301 feeds an isolator 302 that isolates the input RF signal 301 with the SRA input 313. A good isolation is required to avoid input reflections that may affect negatively the cyclic regeneration process, illustrated in FIG. 3B by trace 353. A combiner 303 combines the isolated input signal 313 and a loop signal 312 coming from another isolator 304. For the same reasons the signal 312 may preferably be isolated. A combined signal 305 is amplified by an amplifier 306 of loop gain GL with GL in a range of 0.1 to 100. An output signal of the amplifier 306 is sampled on and off with a switch 307 controlled by a control signal 308. The switch output's signal 309 is the output of the SRA 300 and also feeds a loop delay 310. The loop delay 310 has output 311 and feeds the isolator 304.

Figure 3B:
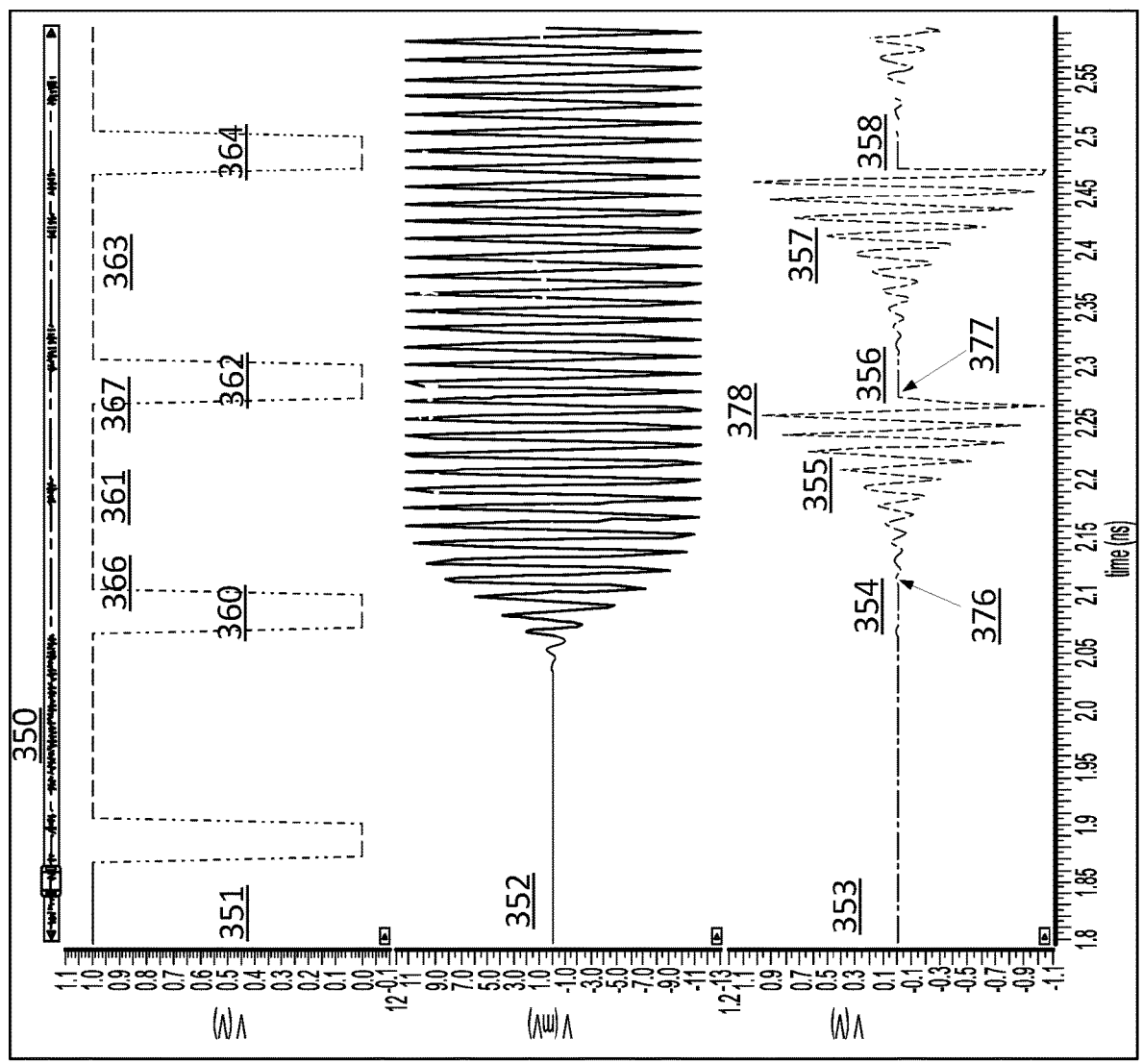
FIG. 3B is an example time response diagram of an SRA

FIG. 3B is an example time response diagram 350 of an SRA such as SRA 300 of FIG. 3A. Trace 351 is a sampling clock frequency applied to the control signal 308. Trace 352 corresponds to the input modulated signal 301. Trace 353 corresponds to the output 309 of the SRA 300.

When the level of the control signal 308 is such that the switch 307 is in an open position at 360, 362, 364, etc. the SRA opens, resets the output and produces about zero at 309 shown in 354, 356, 358, etc. This is the reset mode. Oppositely when the level on the control signal 308 is such that switch 307 is in closed position at 361, 363, etc., the SRA amplifies and regenerates the input 352 providing a time variant output with a growing envelop at 355, 357, etc. For optimal synchronous amplification, the delay 310 of delay's value M must bring a feedback signal at the combiner 312 in phase with the isolated input signal 313. Since the input carrier signal is a sine wave, M=M1 with M1*360 degrees with M1=1, 2, . . . , K meets the condition for synchronous amplification=regeneration. Alternatively, M=M2 with M2*180 degrees, with M2=1, 2, . . . , L is also valid but a negative loop gain 304 must be used for odd M2 values (and positive for even values).

The SRA satisfies the criteria for a receive sampler when the sampling clock frequency is applied to 308. In most situations, the receiver with SRA 300 is not contiguous to the transmitter and their local transmit and receive clock rate frequencies are not synchronized in phase and frequency, even if similar, until a specific processing is added in the receiver, to synchronize them called clock data recovery or CDR. At a maximum symbol rate around the value of sampling rate, a CDR cannot work with a receive sampler such as the SRA 300 placed between it and the receive antenna since it does not comply with the Nyquist criteria, and may hide the modulation transitions and distort the signal after sampling. Indeed, as both transmit (symbol rate) and receive frequencies (receive sampling clock) are not exactly identical, a "parasitic" frequency beat (frequency difference) is created at the sampler output 309 that makes the sampling position slide relative to the incoming symbol at a rate function of the frequency beat amount. As the relative sampling position with the incoming symbol slides, the maximum magnitude of the envelope of 353 changes. Over the course of 1 UI, its transfer function follows approximatively a bell shape. The maximum peak regeneration envelope that follows the value of 378 is maximum with the best timing of sampler regeneration's start at 376 with its clock 366 vs. the incoming symbol and reduces progressively as the timing get worst until a minimum. The process is cyclic if the frequency beat is constant. As the maximum peak regeneration envelope at 309 varies cyclically with time due to the frequency beat, it generates cyclic errors that cannot be resolved by a CDR or other conventional means.

This failure is explained by the Nyquist theorem that states that asynchronous sampling of an input signal must have at least twice the max. frequency of the input signal (symbol rate). Therefore, an SRA such as 300 sampled at a sampling rate similar to the incoming symbol rate is unable to provide an information of symbol synchronization.

Figure 4A:
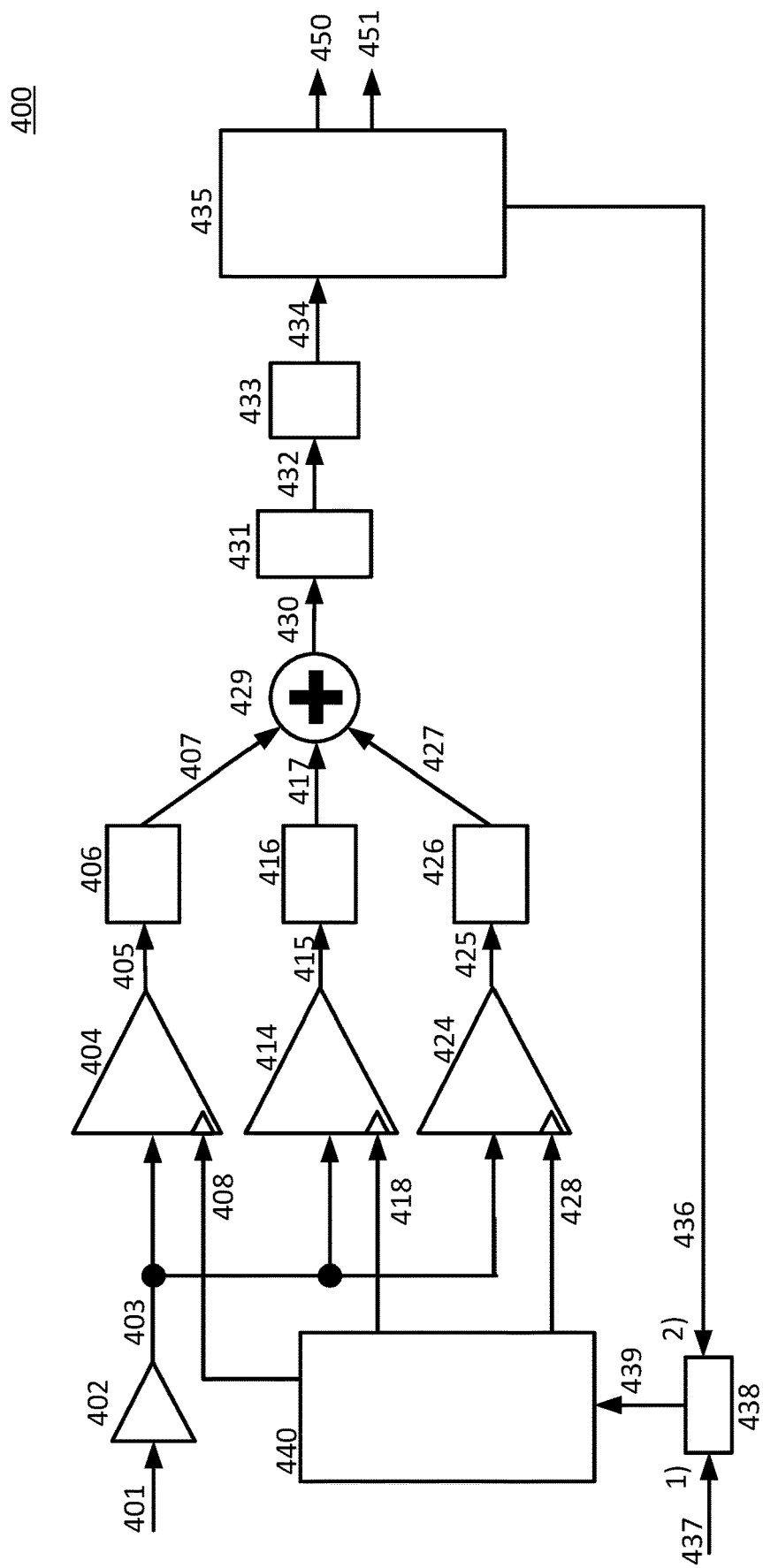
FIG. 4A is a block diagram of an example radio-frequency receiver including SRAs and 3-phase symbol synchronization

FIG. 4A is a block diagram of an example radio-frequency receiver 400 that combines the implementation 100 of FIG. 1 and the implementation 300 of FIG. 3. Receiver 400 includes 3 Super Regenerative Amplifiers (SRAs) with 3-phase clocking providing a signal useful to performing symbol synchronization. In this implementation, each receive sampler is replaced by a SRA that is a receive sampler in itself. An input amplitude modulated received signal 401 feeds an optional isolator 402 that isolates the RF input 401 and the inputs of the SRAs 403. Not shown, each SRA 404, 414, and 424 may include their own input isolator for additional isolation toward the RF input 401 but also to provide isolation between each other. A sampler clock 408, 418, and 428 inputs to each receive SRA 404, 414, and 428.

In this implementation, the envelope extractors are replaced by envelope detectors 406, 416, and 426 that provide the envelope extractor function. The respective SRA outputs 405, 415, and 425 are followed, respectively, by the envelope detectors 406, 416, and 426 that demodulate the amplitude modulated signal. As described previously, a typical envelope detector is an absolute value function or square function and can be implemented with a diode and capacitor, or with a self-product function or with a rectifier. Not shown in the receiver 400, each envelop detector 406, 416, and 426 may be followed by a low pass filter. Each low pass filter can be included to suppress mostly the $2^{nd}$ harmonic of the input carrier frequency and other high frequency terms.

The baseband signals 407, 417, and 427 collectively contain the information of symbol transition and are fed to and processed in a combiner 429 to create a useful output signal. The output signal 430 of the combiner 429 recreates an approximate copy of the incoming signal 401 before sampling. The copy follows the incoming symbol rate information at 401 and the magnitude accuracy is function of the time quantization sampling and the cyclic average provided by the 3 inputs 407, 417 & 427: As the number of SRAs 404, 414, and 424 is limited to 3, the approximation of the input amplitude signal is coarse. The output 430 feeds a filter 431 that averages out the signal. The filter output 432 feeds an optional equalizer 433 to open the eye height as much as possible. The equalizer output 434 feeds a CDR 435 that locks on the phase and frequency of the symbol rate of the signal 434. The CDR 435 outputs the received data in 450 and the recovered clock 451, both in phase and frequency synchronicity with the incoming data symbols of incoming signal 401.

Coming back to the SRAs 404, 414, and 424, the frequency of each clock 408=SRACK1, 418=SRACK2, and 428=SRACK3 is substantially identical to each other clock, i.e., SRACK1=SRACK2=SRACK3 while their phase SPCK1, SPCK2, and SPCK3 are set to 120 degrees apart. Moreover, as discussed earlier, the ratio of sampling rate at 408 (and 418, 428) vs. incoming symbol rate at 401 is about one, R≈1. This plus 3 phases 120 degrees apart creates a tri-phase configuration that provides a circular symmetric configuration and 3 samples per incoming symbols. When the signals 407, 417, and 427 are combined in the combiner 429, this configuration provides a circular averaging or sliding averaging that creates an approximate copy 434 of the envelope of the input signal 401, that is the input symbol signal.

In some implementations, the process of symbol synchronization is made in 2 steps: With a switch 438 in position 1), an independent receive reference oscillator 437 provides a clock of frequency similar to the one of the incoming symbol rate. When the switch 438 is in position 1) this reference clock REFCK is output at 439 and feeds a tri-phase clock generator 440. The clock generator 440 generates the 3 clocks 408, 418, and 428 of frequency equal to REFCK but with 120 degrees phase difference. Optionally those 3 clocks may have a duty cycle that is not 1 but DC1, for instance DC1=85%. As described above with respect to FIG. 3, an SRA such as SRA 404 typically has a regeneration phase and a reset phase. Assuming an input clock 408 level "1" equates to the regeneration phase and "0" to the reset phase, a duty cycle DC1 of 85% makes the SRA regenerate during 85% of the symbol time and reset the SRA for 15% of the time, such as shown by the signal 351 (SRACK1) and 353 (SRA1 output) in FIG. 3B.

Figure 5:
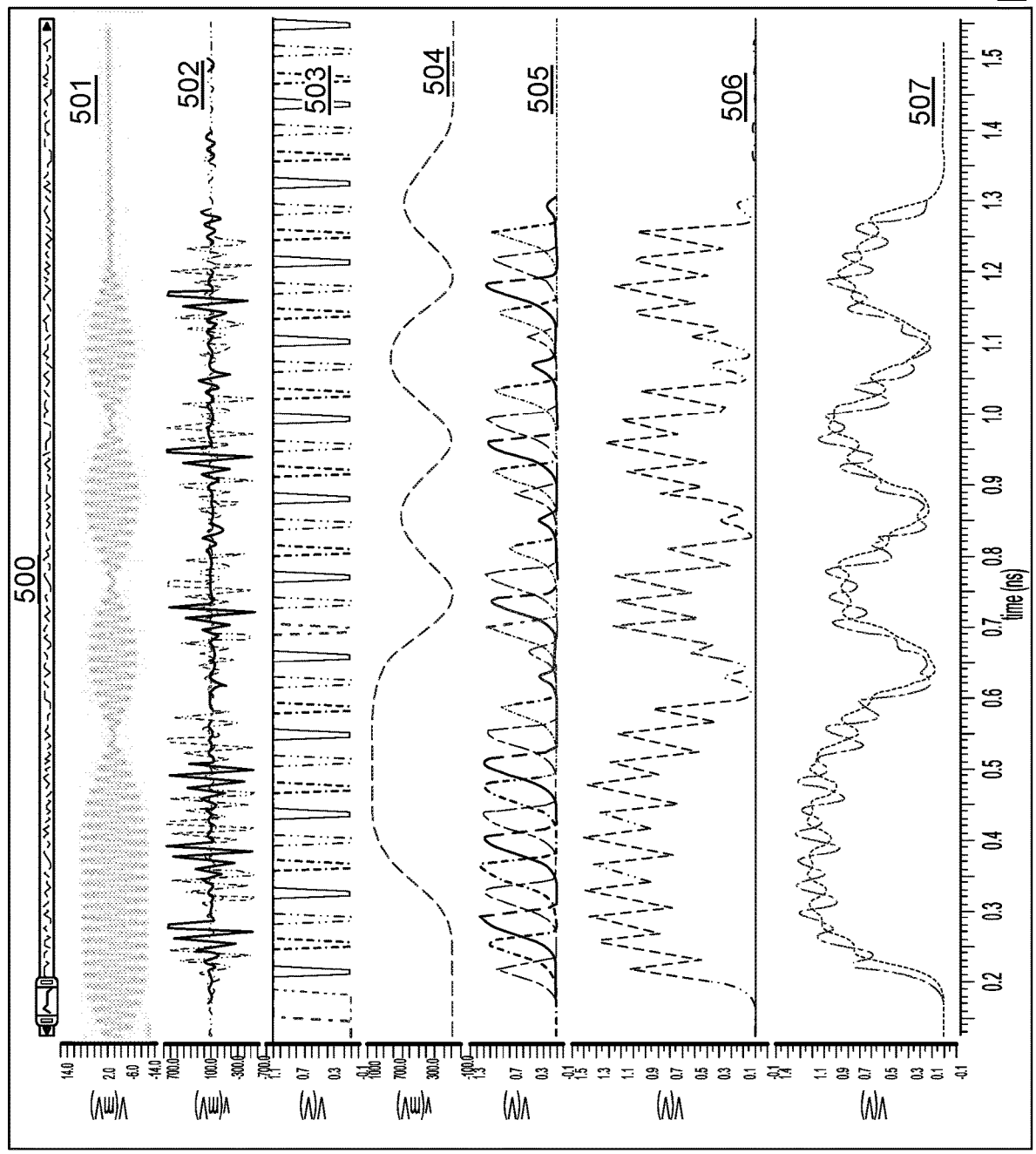
FIG. 5 is an example time response diagram of various signals of a radio-frequency receiver including SRAs and 3-phase symbol synchronization

During this phase, at switch position 1), the signal 434 feeds the CDR 435 and enables CDR 435 to lock to the incoming symbol frequency and phase at 401 due to the multiphase combining 429. The combined low pass filtered signal at 432 is an approximate copy of the envelope of 401 and the contributions of the sampling clock 408, 418 and 428 have been filtered out (as shown in FIG. 5 trace 507). In consequence the method provides full operation performance with any phase difference between the incoming symbol at 401 and the clock frequency and phase at 437. In theory the method works with any frequency ratio R between the receive sampling clock rate and the transmit symbol rate as well, but if both frequencies are too far away from R=1, it may make the CDR locking process longer or even very difficult. Typically, the ratio R should be set into a range of 0.8 to 1.5 with a preferred value of R≈1. At the end of phase 1) the CDR is locked to the phase and frequency of the incoming data symbols at 401 and it generates a clock rate 436 synchronous to the incoming symbols. Furthermore, the output received data 450 and output regenerated clock 451 are as well valid and synchronous to the incoming symbol rate.

At the start of phase 2), an indication of locking may be read from the CDR 435 and if so, the switch 438 position is changed to position 2).

In another implementation, another event may trigger the change from state 1) to 2) of the switch 438.

In yet another implementation, an elapsed time after start of phase 1) may trigger phase 2).

In phase 2), the CDR 435 is providing a synchronous clock 436 and 439 to the tri-phase clock generator 440. By synchronous clock it is meant that the clock 436 is frequency and phase synchronous to the incoming symbol information at 401. In other words, it has substantially the same frequency as the symbol rate information in 401 and a constant phase difference with the one of 401. In the second phase 2), as 436 is a synchronous clock, the 3 SRAs are clocked synchronous vs. the incoming symbol information at 403.

In some other implementations, a method searches for the SRA that has the timing for the best regeneration that is the highest maximum peak regeneration amplitude 378 and uses only this SRA for tracking the symbol synchronization. In that case, the other two SRAs and envelope detectors may be switched off to save power, temporarily or during the full duration of operation. A metric for this method may use the highest value of RMS value amongst the signal 407, 417, and 427 computed over a number of symbols. Another one is the average value of the signal 407, 417, and 427 computed over a number of symbols. Tracking with only one SRA requires additional processing to track the loss of synchronization over time that can be slow or fast depending of various factors such as: channel variation with time, change of temperature in the transmitter or the receiver, transmit or receive oscillator phase noise, jitter in the incoming symbol rate, etc.

Coming back to phase 2), given the synchronous clocking at 408, 418, and 428, the small jitter due to sliding combining theoretically completely disappears. In a realistic implementation and due to very fast data, processes and impairments, a residual jitter is expected but of smaller value vs. the switch position in phase 1). This doesn't consider any incoming symbol rate jitter from the transmitter that is not corrected by this method.

Figure 4B:
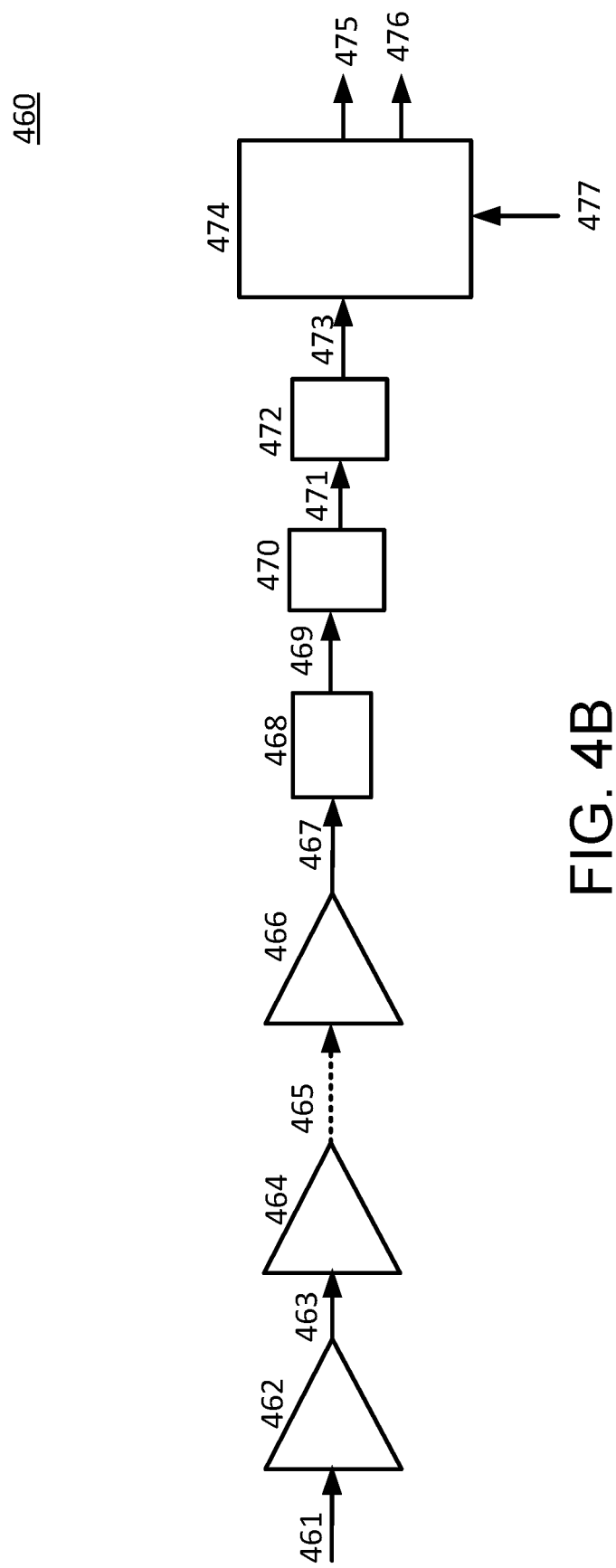
FIG. 4B is a block diagram of an example radio-frequency receiver including a prior art receiver without sampling.

FIG. 4B is a block diagram of an example prior art radio-frequency receiver 460 that is not sampled. It includes an LNA chain 462, 464, 466, an envelope detector 468, an optional filtering 470, an optional equalizer 472 and a CDR 474. The LNA chain amplifies the generally weak input modulated receive signal to a level such that can be processed by the envelop extractor or detector 468. An input amplitude modulated received signal 461 feeds the first LNA stage 462. Its output 463 feeds a second LNA stage 464 with output 465. N LNA stage are connected in series until last stage 466 with output 467.

Signal 467 feeds the envelope detector 468 that can have a quadratic transfer function if it is a self-multiplier. This derives from $x(t)*x(t)=x^2(t)$. This square law transfer function may need the signal 467 to drive the envelope detector with a rather high signal for which more LNA amplification is needed. The envelop detectors output 469 feeds an optional filter block 470 to filter out the high frequency terms (mostly the $2^{nd}$ harmonic) and keep the baseband signal at 471 that is substantially equal to the envelope of the modulated signal. Some envelop detectors may have an intrinsic limitation of frequency bandwidth and will reduce the high frequency terms intrinsically so no optional filter 470 may be required. The output of the optional filter 471 feeds an optional equalizer 472. The equalizer 472 may be used to compensate for frequency bandwidth limiting effects such as Inter Symbol Interference (ISI) due to the band limiting of the transmitter, channel and receiver. Equalizer may be implemented with one or more of the following functions: Continuous time Linear Equalization (CTLE), Feed-Forward Equalizer (FFE) or Decision Feedback Equalizer (DFE).

A CTLE is generally an analog equalizer that emphasizes some frequencies of the signal versus other to balance for their attenuation through the communication channel, Tx filtering and LNA band limiting (altogether called channel). It can be compared to an audio equalizer used to boost some signal components that speakers have difficulty reproducing or to emphasize some part of the frequency spectrum to match the sensitivity transfer function of the human ear or simply to pre-distort low, mid or high frequencies for music entertainment purpose. In fast data communication, CTLE attempts to correct the high frequency content of the signal that has been reduced by the channel. Typically, 0 dB to 10 dB of high frequency gain can be added with one or multiple stages of the function 1—low pass filter. A simple low pass filter is a RC filter. If the data rate is 6 Gbps with binary modulation, the CTLE pre-emphasis max gain may be around 6 GHz. The max gain and frequency may be adjustable for adaptability to the channel.

An FFE similarly emphasizes high frequency content selectively but is generally implemented digitally. In theory FFE requires the receive signal to be converted to N bit in the digital domain with a fast analog to digital converter (ADC) and processed digitally. K digital delays of the sampling frequency placed in series are required and each delay tap output $x(k-i)$ feeds a common adder through a synaptic weight $C_i$ (or multiplying function). The output of the FFE is the adder output signal. The coefficients $C_i$ must be set such as the FFE creating an inverse transfer function of the channel for best performance. Various algorithms exist to learn and set the coefficients optimally such as a Minimum Mean Square Error method (MMSE).

A DFE is generally composed of a feedforward section such as FFE and a feedback section. The FFE section acts similarly to an FFE as described above while the feedback section of the DFE attempts to correct ISI and read previous symbols to estimate and equalize the future symbols. It has generally H feedback coefficients and H+1 feedforward coefficients. Similarly to FFE, the implementation is generally digital with a resolution of N bits. DFE can be a powerful equalizer but is also more complex. Also due to a nonfinite impulse response it can be unstable (no convergence) so a training sequence is usually used.

Coming back to 460, the optional equalizer output 473 feeds a CDR 474. The CDR output is the received data rate 475 and an optional receive clock rate 476 is provided, both being synchronous to the incoming receive symbol rate. The CDR performs all or some of the following functions: Additional filtering, additional equalization, slicing the signal if the order of modulation is low (binary or 4 levels), mapping the signal to N levels with fast ADC, coding, etc. Finally, the CDR 474 includes the function of synchronizing the phase and frequency of the input receive symbol stream. This can be achieved with a phase-locked loop (PLL) that locks to the incoming symbol frequency and phase. In another implementation, the CDR uses a received clock 477 at a clock rate close to the incoming symbol rate and a phase interpolator that compensate for the frequency beat created by the difference of frequency between the incoming symbol rate and the local receive clock. An example of receive clock rate 477 is 9.924 GHz versus an incoming symbol rate of 10.012 GHz which creates an unwanted beat frequency of the difference that is 88 MHz. At the end the frequency beat must be reduced to substantially zero by the phase interpolator or by the PLL for proper operation.

Coming back to the LNA chain 462 to 466, it is good practice to have a high gain and low noise figure in the first stage such as minimizing the noise figure of the receiver. Each additional gain stage increases the signal amplitude for which the envelope is substantially equal to the information for an amplitude modulation signal. However, for high data rate systems and generally high frequency bandwidth, it becomes increasingly difficult to have LNA chain with high performance and keep the power consumption low. For instance, a target LNA gain of 50 dB with 10 Gbps in ASK modulation would require a bandwidth of about 20 GHz and a 5 LNA stages at 60 GHz with a RF CMOS 90 nm process. The power consumption may be as high as 60 mA to achieve this wideband high gain with a noise figure of about 10 dB. Also interference rejection would require either an input EHF filter that is difficult to implement on an integrated circuit (IC) or the LNA having a higher intermodulation limit, that is being able to cope with higher input interferences without creating intermodulation products that fall into the band; In other words, a more linear LNA chain with more current consumed.

In comparison, a sampled receiver such as receivers 100, 300, or 400 may have significant advantages despite some additional complexity: First the regeneration gain (total gain) in one stage can be very high and is limited by reset (quenching) speed 261, parasitic on the IC, transistor gain, transistor celerity (fmax and f_transition), and ability to discharge in a fraction of cycle the energy built up in the loop in 300, etc. The theoretical gain is function of the carrier frequency versus the symbol rate, the loop gain GL and the duty cycle of regeneration vs. reset as shown in 351. When there is no or little dissipation in the SRA such as 300, theoretical gain up to 60 dB or more can be achieved with one stage. When dissipative and parasitic elements are added, the loop gain must compensate for those and increase. More loop gain means more current and power consumption.

For such scenario, gain in excess of 40 dB per stage have been simulated. Assuming the complexity of 1 stage of LNA and SRA is similar, 3 SRAs as per 404, 414, and 428 would consume 12 mA*3=36 mA vs. 5 cascaded LNAs of 12 mA*5=60 mA, a significant reduction of power consumption.

Another advantage of using sampled receive amplifiers such as 300 or 404 is a potentially lower noise figure. As the SRA is a non-linear device that provides a cyclic time variant response as in 353, its equivalent frequency bandwidth is also non-constant. It appears to be wider at the regeneration start time 376 and reduces progressively until the end the regeneration cycle when the output amplitude is maximum at 378. If the LNA and SRA are tuned with inductance and capacitances with similar values, their quality factor may be similar (at the SRA regeneration start). However, as the SRA bandwidth reduces progressively until the max regeneration at 378, its noise bandwidth decreases. If the bandwidth reduction is half, the noise at the SRA output when sampled around the time 378 is reduced by half that is a 3 dB reduction in power noise.

Furthermore, as shown in 355, the SRA has the ability to improve the rise time of the input modulated signal 352. Since the output rise time can be reduced, this translates in a frequency bandwidth regeneration of a factor 1.1 to 3 especially if the received input signal suffered from medium to severe band limiting (slowed envelope rise time) as shown in 352. In comparison there is no bandwidth regeneration in an LNA chain. The bandwidth regeneration is not an advantage when combining several signals of SRA envelope detected and filtered outputs 407, 417, and 427. However, 1 of the N sampled amplifier SRA envelop detected filtered output e.g. 407 can be processed separately and provide high bandwidth regeneration on that receive data path while the N combined samplers create the signal 432 or trace 507 that permits the CDR to lock on the incoming symbol rate. In summary, receive sampler or SRA as described in this specification can provide several advantages over a prior art receiving including providing more receive gain in less amplification stage, less power consumption, lower noise figure, and frequency bandwidth regeneration.

FIG. 5 is an example time response diagram 500 of various signals of a radio-frequency receiver including 3 SRAs and 3-phase symbol synchronization such as for receiver 400 in FIG. 4A during the phase 1) mode, where the local clock 437 is used. Trace 501 shows the input signal e.g., the incoming signal 401 in FIG. 4A. Trace 501 denotes an input ON-Off Keyed (OOK) amplitude modulated signal at 60 GHz after passing a heavily band limited frequency channel. The trace 501 shows the slow rise and fall times of the envelope transitions between symbols, in other word the signal is spread out in time due to frequency band limiting. Trace 502 in dash line shows the output of first SRA e.g. SRA 405, while traces 502 in solid line and dash dot line show the outputs of a second SRA, e.g., SRA 415 and a third SRA, e.g., SRA 425, respectively. Trace 503 shows the clocks input to each SRA, e.g., clocks 408 in solid line, 418 in dash dot line, and 428 in dash dot dot line. There is a duty cycle of roughly 85% regeneration and 15% reset. The 120 degrees cyclic phase delay between the clock traces provides a cyclic circular symmetric behavior in time where the sampling is always delayed by 120 degrees from SRACK1 to SRACK2 to SRACK3 to SRACK1 next symbol, etc.

Trace 504 shows the demodulated signal from a prior art LNA plus envelope detection plus filtering chain for comparison.

Trace 505 is the SRA signals after envelop detection and filtering one per dash dot line, dash line and solid line corresponding to signals 407, 417, and 427. The envelope value made with the maximum of the 3 traces follows roughly the trace 504 (except a different delay). Trace 506 shows the combiner output signal 430 where the 3 signals 407, 417, and 427 in 505 have been added. Trace 507 shows the signal after filtering type 1 and 2. At this point the correlation between 507 and 504 becomes obvious except for a minor delay of 504 (processing delay). At this point, the input phase change shadowing receive sampling clock still visible in 506 has been well removed and the signal 507 can be fed to a CDR for symbol synchronization or further processed before feeding the CDR.

Figure 6:
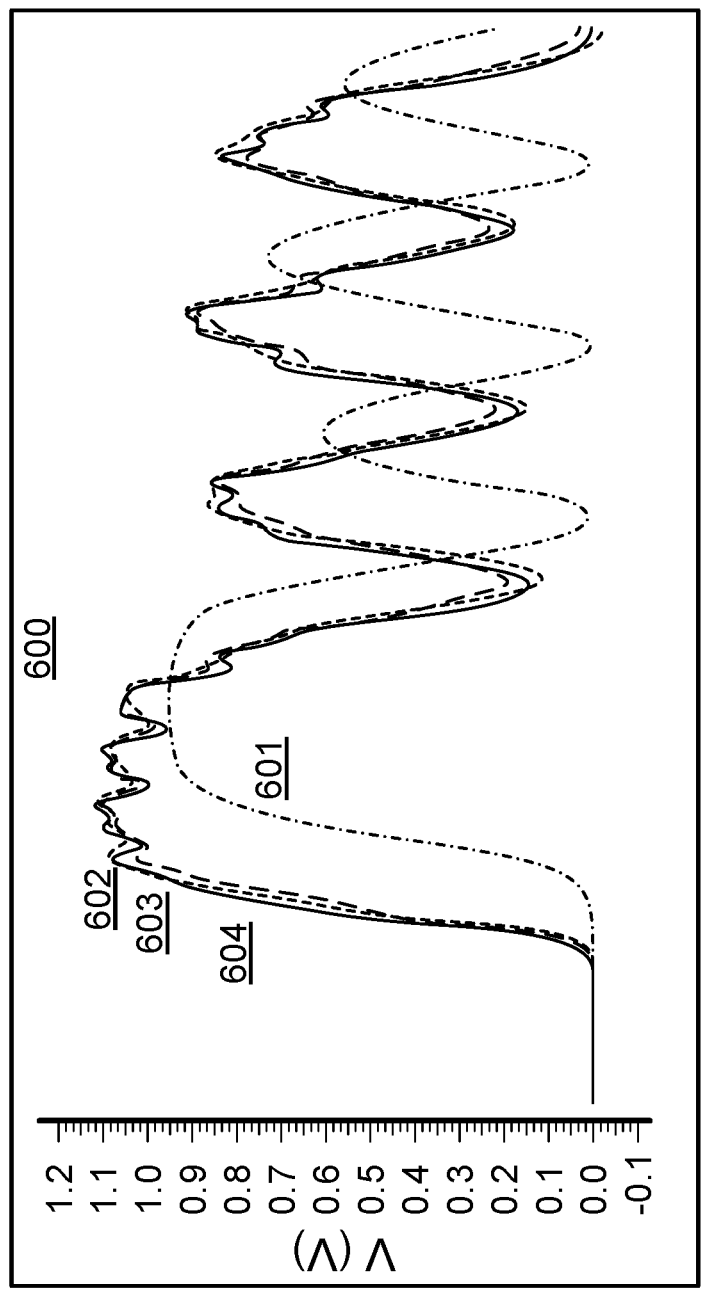
FIG. 6 is an example time response diagram of the combined envelop signal after various filtering vs. a prior art demodulated signal.

FIG. 6 is an example time response diagram 600 of the combined envelop signal after various filtering, according to phase 1) mode of FIG. 4A, vs. a prior art demodulated signal 601. Signal 601 corresponds to signal 504 of FIG. 5 replotted in a different vertical scale. It corresponds to the baseband signal from a prior art receive chain and is shown for comparison purpose. The traces 602, 603, and 604 show the signal 432 after 3 various types of filter, called type 1, 2, and 3. The correlation between 601 and those is obvious and, except some different processing delay and amplitude, they look similar. The examples of FIG. 5 and FIG. 6 are plotted with a local oscillator frequency of 9.1 GHz that is independent of the one of the incoming data symbol rate of 9 Gbps at 9 GHz. Despite the frequency (and phase) difference, the signal 507 of type 1 or 2 in 432 is valid for locking the CDR 435. The same applies for the signals 602, 603, or 604, which are all valid to feed the CDR 435 and produce symbol synchronization.

Figure 7:
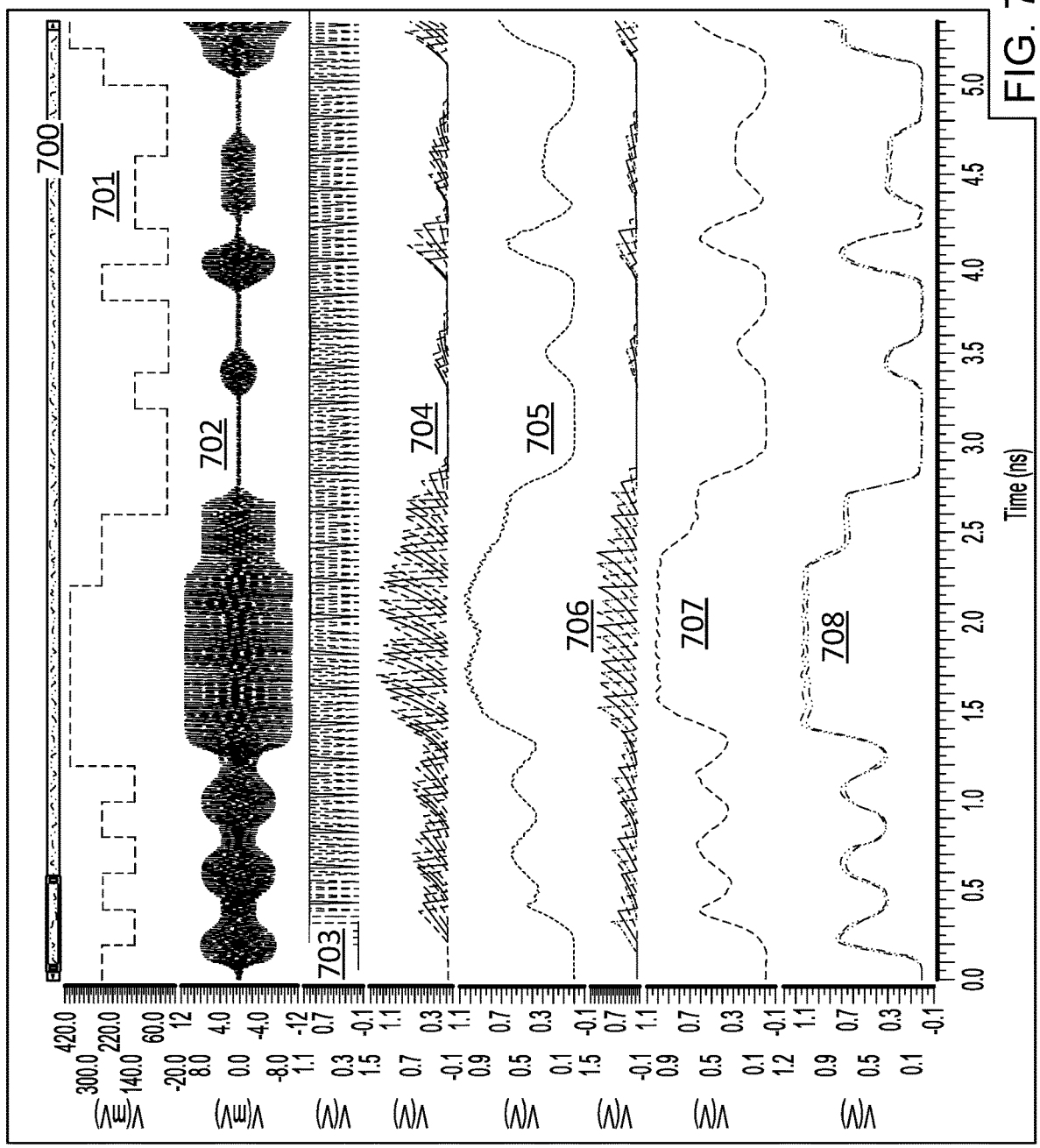
FIG. 7 is an example time response diagram of various signals related to the combined envelop of a 4-ASK modulated signal with 3 samplers & phases, and 5 samplers & phases after filtering vs. a prior art demodulated signal.

FIG. 7 is an example time response diagram 700 of various signals related to the combined envelop of a M-ary amplitude modulated signal that is a 4-ASK amplitude modulated signal with 3 or 5 samplers and phases and compared to a prior art demodulated signal. From top to bottom, trace 701 shows the time response of a transmit 4-levels symbol signal before ASK amplitude modulation with a frequency carrier at 64 GHz. One can notice the 4 equidistant antipolar amplitude levels for a 4-ASK modulation ranging from 0 to Vmax, for instance 0 V, 0.33 V, 0.66 V to 1.0 V. In the example of FIG. 7, the gain has been reduced to 0.4 V/V so that the previous values have been multiplied by 0.4 and rescaled down to respectively 0 V, 0.132 V, 0.264 V, and 0.4 V as shown in trace 701.

Trace 702 shows the transmit signal after 4-ASK modulation at the transmitter.

Trace 703 shows the receive sampler clocks with 5 phases that are cyclic and circular. It shows an implementation with 5 parallel receive samplers and 5 receive clocks of same frequency but with phases of 360/5=72 degrees apart; in this example, 5 SRAs are used as the samplers receiving the same receive clock frequency 108, 118, . . . , 128 but different phase at 108, 118, . . . , 128. The phase for sampler #1 108 is 0 degrees, the phase for sampler #2 118 is 360 degree/5=72 degrees, the phase for sampler #3 (not shown) is as well 72 degrees more than the one of sampler #2, the phase for sampler #4 (not shown) is as well 72 degrees more than the one of sampler #3, and the phase for sampler #5 128 is as well 72 degrees more than the one of sampler #4. In absolute values and in a trigonometric circle, the phases of sampler #1 to #5 are respectively 0 degree, 72 degrees, 144 degrees, 216 degrees, and 288 degrees. As described above, when the P sampling clock phases PHi of the N samplers meet the following conditions: 1) P=N, and 2) 360 degrees trigonometric circle is divided by exactly N equidistant phases, this clock phase arrangement provides a cyclic sampling continuously equidistant in phase as shown in trace 703.

Trace 704 shows the superposition of the 5 envelop extractor filtered outputs 105, 115, . . . , 125 plotted in one graph. At this point, and by comparing with the receive input signal showed in trace 702, we can distinguish that both envelopes are similar except some delay and some low pass filtering; in other words, the information of the input signal 701 can be extracted by combining and filtering the 5 signals of trace 704 together.

Trace 705 is the output of the combiner after filtering at 107 with the 5 input signals 105, 115, . . . , 125 shown in trace 704. An approximate copy 107 of the incoming symbol data is created due to the circular sliding averaging. It is synchronous only to the incoming symbol rate, NOT to the receive sampler clock rate because the sampling data of each sampler has been filtered out by the combining process as can be seen in traces 704 and 705. Trace 705 is an approximate copy of the incoming modulation signal 701. The main distortion is slower rise and fall times at the transitions due to the frequency band limiting of the channel.

Trace 706 shows another implementation where only 3 samplers and 3 phases have been used as in the receiver of FIG. 4A. Trace 706 shows the 3 inputs (407, 417, 427) to the combiner 429. One can notice a coarser time granularity vs. trace 704 where 5 samplers were used. Trace 707 shows the receive output 432 after combining and filtering. Again, this signal is an approximate copy of the transmit modulating signal 701.

Finally, the signal 708 illustrates one produced by a prior art receiver made of receive LNA, receive envelop detector and filtering (no receive sampler(s)). This signal 708 is as well an approximate copy of the transmit modulating signal 701. While trace 708 is similar to traces 707, 705 and 701, it doesn't show the advantages of receive sampler technique vs. prior art described in the section of FIG. 4A including: More receive gain in less amplification stages, less power consumption, lower noise figure, and frequency bandwidth regeneration. This denotes the particular interest in the receive sampler techniques and embodiments described in this specification.

Figure 8:
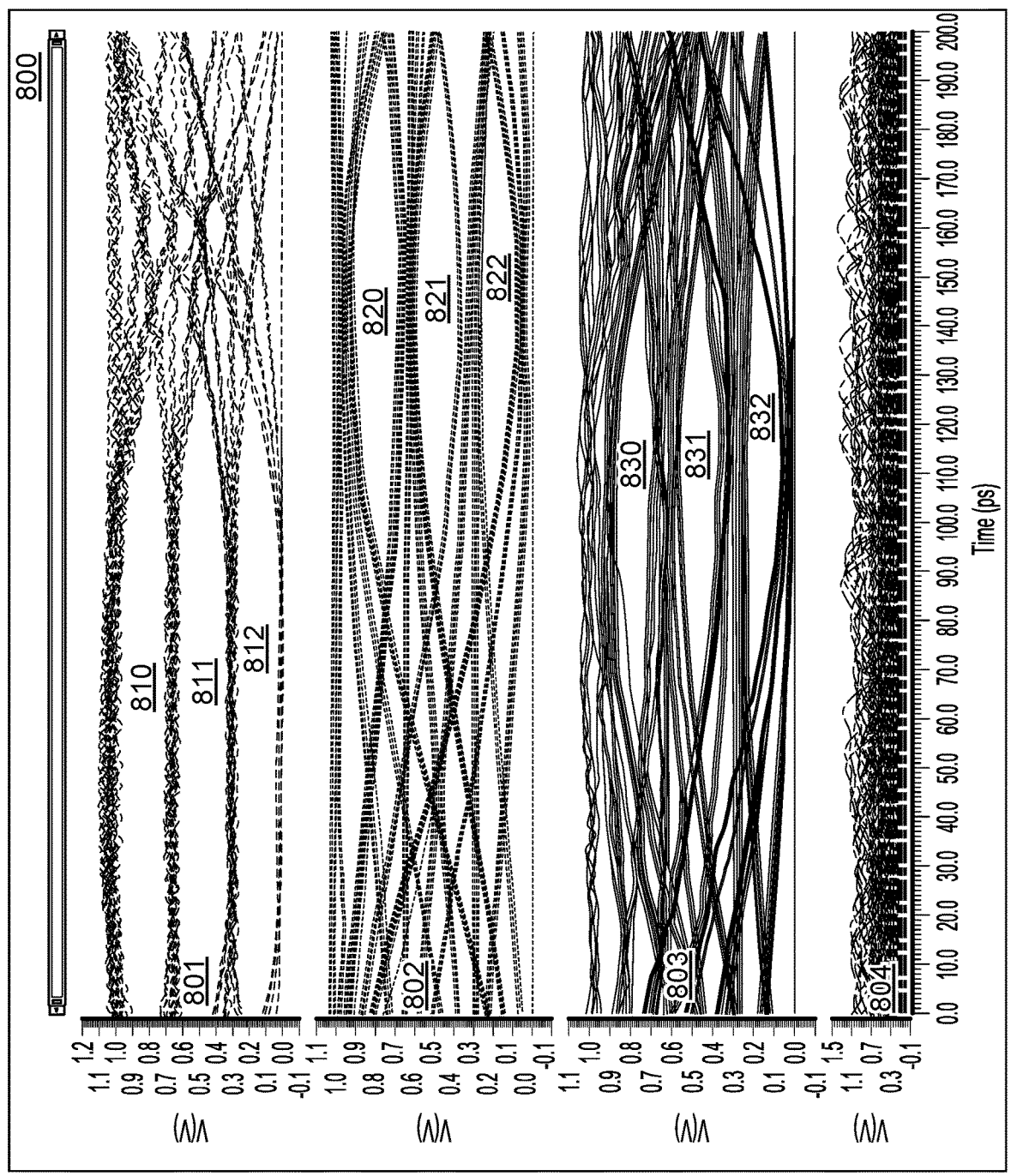
FIG. 8 is an example eye diagram of the signal after 4-ASK combining for 3 samplers and phases, and 5 samplers and phases vs. a conventional demodulated signal.

FIG. 8 shows example eye diagrams 800 of the most important signals in diagram 700 of FIG. 7. A person skilled in the art recognizes the value of eye diagram representation and its ability to show visually if a baseband signal has a pattern that lead to bit error rate or not, if the signal frequency and phase over time are fixed, varying, or includes jitter, and if the eye height (vertical) and eye opening (horizontal) are sufficient for a particular application. The eye diagram is set to repeat the signal over and over onto itself in a horizontal scale of 1 UI in the graph. The horizontal scale corresponds to 1 UI wide for instance 200 ns for a 5 Gsymb/s transmit symbol rate signal. Traces 801, 802, 803 and 804 are repeated over and over at the rate of the incoming transmit symbol rate, NOT the local received clock rate. The latter may be similar to the one of the transmit clock but is not locked in frequency and phase to it unless an additional synchronization mechanism is added.

In FIG. 8, the incoming symbol rate is 5 Gsymb/s, the AM modulation is 4-ASK mapping 2 bits per symbol thus a data rate of 10 Gbps, and the received local clock is set to 5.02 GHz which produces a beat of 5.02G−5G=20 MHz with a period of 50 ns. In comparison one UI or symbol time is 1/5G=200 ps in this example, therefore the beat frequency lasts about 50n/200p=250 symbols. If only one sampler was used (without combiner) instead of 3 with 3 phases or N with N phases with combiner, the output signal to the CDR 107 would be out of sync in a fraction of the beat period of 50 ns, e.g., 60% of it. It may show approximate synchronization for instance for a limited duration of 20 ns that is a length of 40% of 250 symbols=100 symbols long, followed with 30 ns of out of sync error signal that is 75 symbols long, and this cycle repeated over and over in time.

Trace 804 shows the eye diagram of such a signal output of only one sampler after envelope detection and filtering 105 or 407 and a person skilled in the art knows that this signal cannot be resolved by a CDR as not in sync with the incoming symbol rate. As a reminder all eye diagram traces in diagram 800 are referred to the incoming symbol rate. More explicitly, no open eye is visible in 804 which denotes that the signal is not synchronized to the incoming symbol rate (but to the local received clock).

Trace 801 is the eye diagram of the receive output signal of the prior art demodulator trace 708 in FIG. 7. It shows the 3 characteristic eyes of a 4-ASK modulation 810, 811, 812 that are wide open in time and in amplitude. The horizontal opening of theoretically 1 UI is reduced to about 60% of one UI due to the channel frequency band limiting. Some minor residue of frequency carrier oscillations at double frequency are visible in each trace between 810, 811, 812 due to non-ideal filtering after the envelop detector.

Trace 802 is the eye diagram of trace 707 in FIG. 7 that is the receive output signal of 3 parallel samplers and phases implementation as in 400 after combining and filtering. Again it shows the 3 characteristic eyes of an 4-ASK modulation 820, 821, 822 and the eyes are also open in time and in amplitude. The horizontal opening is slightly reduced due to the cyclic averaging combining as the N parallel samplers' system collectively behaves similarly to a sliding window averaging filter that reduces the signal bandwidth. The main take-away from eye diagram 802 is the demonstration of the validity of the techniques described in this specification for providing a received output signal synchronized with the incoming symbol rate 401 and not to the sampler clocks 408, 418, 428. This output signal can thereafter feeds a CDR that may include various functions such as: further filtering or equalizing the signal to increase the opening of the eyes (higher eye height or decrease jitter) or increasing the signal over noise ratio, mapping the signal with a 1 to N bits ADC, extracting a clock from it, synchronizing and tracking the sampling clock rate and phases to the incoming symbol rate, and sampling the signal to provide output received data and clock.

Trace 803 is the eye diagram of the trace 705 in FIG. 7 that is the receive output signal of 5 parallel samplers and phases implementation as in 100 after combining and filtering. Again, it shows the 3 characteristic eyes of a 4-ASK modulation 830, 831, 832 and the eyes are also well open in time and amplitude. The eye heights are slightly reduced due to the cyclic averaging effect as the 5 parallel samplers collectively behave similarly to a sliding window averaging filter. The main take-away of eye diagram 803 is the demonstration of the validity of the techniques described in this specification with a 4-ASK M-ary modulation and with 5 samplers and phases clocking. The receive clock rate of 108, 118, . . . , 128 is not locked in phase and frequency vs. the one the transmitter thus produces a frequency beat of e.g. 20 MHz that is a period of 50 ns as per the previous example. While each sampler is clocked from the receive clocks 108, 118, 128 and is non-synchronous to the incoming symbol rate, the combined filtered signal after 107 is synchronous to the incoming symbol rate in frequency and phase. It contains no trace of the receive sampling frequency, has no frequency beat vs. the incoming symbol rate and approximates the envelope of the receive signal before sampling 101. It can feed a CDR and after more processing provide received sampled data and reference clock.

This specification has described that the combiner output 107 or 430 can be filtered (by 431 for instance) and represent a copy of the input signal before sampling 101 or 401. In other words, the combined signal 107 or 430 is synchronous to the input signal and not the local received sampling clock 108, 118, 128 or 408, 418, 428, respectively.

In one implementation, the local received sampling clock 108, 118, 128 or 408, 418, 428 is substantially equal to the symbol rate of the input signal. An example of substantially equal is 5.02 GHz vs. an input symbol rate of 5.007 GHz.

In another implementation, the local received sampling clock 108, 118, 128 or 408, 418, 428 is within a few percent of the symbol rate of the input signal. For instance, 5.15 GHz vs. an input symbol rate of 4.98 GHz which is 3.41% higher. Another example is 9.87 GHz vs. an input symbol rate of 10.09 GHz which is 2.18% lower.

In yet another implementation, the local received sampling clock 108, 118, 128 or 408, 418, 428 is within a range of the symbol rate of the input signal for instance the sampler's clock rate is between 2 times the symbol rate of the input signal divided by the number of receive samplers and P time this amount with P a positive real number greater than 1.0. As an example, the symbol rate is 20.1 GHz, the number of receive samplers 102, 112, 122 is 7 and the range of the local received sampling clock 108, 118, 128 is between 2*20.01 GHz/7=5.717 GHz and 22.6 GHz when P=3.95.

In a sampled receiver such as 100 or 400, when the local sampling clock is not synchronous with the incoming signal 101 or 401, the Nyquist criteria applies and must be abided for the output combined signal 107 or 432 to be process-able at maximum symbol rate and not under-sampled. For the scenario where N equidistant clock phases 108, 118, 128 are applied to N receive samplers 102, 112 and 122 and phase delta is 360 degrees/N between the clock phases 108, 118, 128, 2 samples per symbol minimum are needed therefore leading to the following formula: Local receive clock sampling S must be equal or greater than twice the symbol rate SR divided by the number of receive samplers N, thus S≥2*SR/N.

For example, with 5 GHz input symbol rate and 3 receive samplers, the sampling rate S is equal or greater than 5 GHz*⅔=3.33 GHz. This statement has been verified with simulations similar to simulations giving the time response results in 700 and eye diagram results in 800. A range of sampling rate 408, 418, 428 has been simulated that confirms that more than 2 samples per symbol must be chosen for valid reconstruction of the signal 107 or 432. Going back to the previous example with the exemplary 4-ASK modulation signal, the diagram shows the nice and open eyes 820, 821, 822 obtained with S=5 GHz. Reducing S down toward 3.33 GHz or lower shows a progressive reduction of each of the 3 eye-heights and 2) a reduction of each of the 3 eye openings in fraction of 1 symbol time (=1 UI). The 3 eyes close completely around 3.4 GHz and below.

On the other side when the sampling rate 408, 418, 428 is increased for S greater or much greater than 1.0, the 3 eye heights and eye-openings increase on average. With the same example of 4-ASK modulation and 3-phase 3 receive samplers, and 5 G Symbol/s input signal, there are 2*10

G/3=6.7 samples per symbols at S=10 GHz. In relative terms, the 3 eye heights are increased by about 9% and get close to the maximum theoretical value when the channel hasn't any frequency band limiting. Similarly, the 3 eye openings increase by 10%. This is significant for high data rate communication with impairments such as channel band limiting.

In between 5 and 10 GHz there is a gradual improvement on average when 3 samples per symbols become 4 at 6.72 GHz and 5 at 8.3 GHz and 6 at 10 GHz. The improvement appears non-linear having ripple on a linear increase trend. For example, the triple eye similar to 802 is worst at 6 GHz vs. 5.8 GHz by 5%, and worst at 8.3 GHz vs. 7.5 GHz by 7%. Similarly, the performance with 5 receive samplers may create distortion in the combined signal that may be worse than a 3 receive sampler as shown in 705 vs. 707. In particular, between 1.5 and 2.5 ns on the horizontal scale, a double camel toe distortion is visible on 705 vs. none (flat) on 707. This can be explained as follow: In the combining process, N signal are added together with a phase difference. Depending of the signal, the contribution for the magnitude at each time may distort or improve the reconstruction of the copy of the input signal envelop before sampling.

An analogy to explain these artifacts, is the reconstruction of a square wave with a collection of sinewave of different magnitudes and phases, called Fourier expansion. Adding a $3^{rd}$ harmonic to the fundamental sinewave with the correct phase and magnitude changes the sinewave into a coarse approximation of a square wave. Further adding a $5^{th}$ harmonic with the correct phase and magnitude improves more the approximation to a square wave, and so on and so forth. Example visualizations can be found at https://en.wikipedia.org/wiki/Square_wave and more specifically at https://en.wikipedia.org/wiki/Square_wave#/media/File:Fourier_Series-Square_wave_3_H.png and https://en.wikipedia.org/wiki/Square_wave#/media/File:Fourier_series_for_square_wave. gif, each of which are incorporated here by reference. However, if the phase and amplitude of one or more of the nth harmonics are not optimal, it will distort the reconstruction of the square wave even if this term is of high order. A similar phenomenon happens with the N-phase sampling and combining.

In one implementation, the receive sampling clock rate 108, 118, 128 can be set to a value to optimize the reconstruction of the combined filtered signal 107 with the minimum effort, that is minimizing the number of receive samplers needed, for instance 3 versus 5, and as well optimizing the sampling frequency for maximum eye height and eye opening. As an example, 4 receive samplers may be used vs. 7, and the sampling frequency may be adjusted to 6.72 GHz vs. 10 GHz. As has been illustrated in this specification, with the N-phase sampling and combiner, there are 2 degrees of freedom to set the number of samples per symbols: 1) the number of receive samplers and 2) the receive sampling clock frequency. For example, an implementation with 3 receive samplers and 10 GHz sampling clock frequency will give a similar result versus a 6 receive samplers and 5 GHz sampling clock. Depending on the application, the number of parallel samplers (hardware complexity) vs. the difficulty of high sampling rate will be balanced, and more or less of each may be selected.

A comparison can be made between the performance of a N-phase receive sampler and combiner 100 and an oversampling sampler 200. Based on the discussion above, the same number of samples per symbol may be achieved by the former or later solution, however with two drastic differences:

1) The N-phase receive sampler combiner has 2 degrees of freedom and the high sampling rate can be reduced arbitrarily adding more receive samplers and sampling clock phases in parallel. The sampling rate can even be less that the incoming symbol rate. This is of course impossible to achieve with the oversampling apparatus 200 and the fixed number of samples per symbol dictates the oversampling rate. With very high symbol rate technology it is very difficult to oversample many times, which is a serious drawback versus the N-phases receive sampler and combiner.

2) The generation of excess jitter for the oversampling sampler 200 will be as high as symbol rate SR divided by the oversampling rate OS*100 expressed in % while zero for the N-phase sampling combiner 100. For instance, having a symbol rate SR of 50 Gsymbol/s, an oversampling OS of 4 times=200 GHz, the jitter produced by the oversampling sampler 200 will be ¼ of 1 UI or 25% of 1 UI or 25%/50 G=5 ps vs. a symbol time of 20 ps. With the same symbol rate, a 5-phase sampler combiner 100 sampled at 50 G*⅘=40 GHz will give the same number of 4 samples per symbol with 0 excess jitter and a sampling frequency of 40 GHz even lower than the incoming symbol rate of 50 GHz. However, some eye-opening reduction may occur with sampler combiner 100 due to frequency band limiting and averaging due to the combining function.

In other words, in the N-phase receive sampler combiner 100, the number of sampling points per one symbol of the input signal is a number-of-receive-samplers times higher than the oversampling receiver 200 for the same sampling rate, thereby providing the output signal with 1) no or lower excess jitter and 2) higher output signal reconstruction accuracy at 107 vs. the input signal before sampling 101 and 3) the ability for the output signal 107 to feed a CDR for synchronization to the phase and frequency of the input symbol rate.

This principle can be generalized and applied to any input signal, such as a non-modulated analog or digital signal with samplers. In one implementation, receive sampler combiner 100 can be modified to process non-modulated signals whether analog or digital. In this implementation, when receiving a baseband (non-modulated) analog/digital signal, the receive sampler combiner 100 uses multiple parallel receive samplers to sample the information of the received signal periodically. Each of the plurality of receive samplers clocks at a same rate but not a same phase, wherein the rate is in relation with the input signal information. The receiver can include N receive samplers where the phase of the clock rate of a first receive sampler is not delayed, the phase of the clock rate of a second receive sampler is delayed by 360 degrees divided by N relative to the first receive sampler, the phase of the clock rate of a third receive sampler is delayed by 360/N degrees relative to the second receive sampler, and the phase of the clock rate of a fourth receive sampler is delayed by 360/N degrees relative to the third receive sampler such that the phase of the clock rate of each receive sampler N is delayed by 360/N degrees relative to receive sampler (N−1). The receive sampler combiner processes the output of each of the receive samplers and combines the information of each signal; optionally processing the output information of the combining. The number of sampling points per one period of time of the input signal is number-of-receive-samplers time higher than a one prior art oversampling receive sampler for the same sampling rate. The output of the combined information corresponds to a regenerated copy of the input signal before sampling; thereby providing: 1) a signal that can feed a CDR for synchronization, 2) an output signal with zero or lower excess jitter (vs. an oversampling receive sampler), and 3) a high accuracy output (since more samples per symbol can be provided without high ratio of sampling_rate/symbol_rate.

In some implementations, each of the receive samplers includes an amplification function. The amplification may follow at least one of following patterns: linear, exponential, quadratic, time variant, limited between a minimum and maximum magnitude, saturated, progressively saturated. The amplification function is used to amplify the input signal that has been attenuated for instance by a line of transmission, a cable, an optic fiber, a coaxial cable, an Ethernet cable, a bifilar transmission, etc.

In other implementations, an equalization function is added between the input signal and the multiple parallel receive samplers. An example of such an equalizer is a CTLE, a FFE or a DFE.

In yet other implementations, each receive sampler is at least one amongst: A modified SRA that cyclically starts to regenerate with a non-modulated input signal and resets, both states controlled with the sampling clock, a sample and hold, a track and hold, a multiplier, a mixer, a double balanced mixer, a modulator, a demodulator, a switch, a RF switch, and a an analog switch, a comparator, a difference amplifier, a flip-flop, a latch, bistable multivibrator, edge-triggered flip-flop, gated latch, a slicer, a clocked gate, or a clocked latch. For example, a high speed 50 Gsymb/s (20 ps UI) digital signal is received from a multi taps 0.2 km-5 km long fiber optic, demodulated, pre-amplified, and pre-processed. The input signal can originate from any of the taps at various length of the fiber therefore exhibits various frequency band limiting profiles and distortions. Input is noisy and attenuated to low or mid amplitude and may have up to 35% jitter relative to 1 UI. In such a configuration a prior art processing such as brute force amplification, simple analog equalization and slicing may not process the signal without intermittent bit error rate. The N-phase combiner may bring value vs. this simple processing and other techniques to process the signal for mid-high level of noise and distortion. The signal may be amplified and sampled in the N branches, combined, and filtered. If the amplification is enough for logic levels, digital flip-flops having high limited gain can be used as samplers. With 5-phases receive samplers sampled at 75 GHz maximum with and exemplary IC process (13.3 ps/5=2.67 ps) and with a delta phase of 360/5=72 degrees delta per sampler, 7.5 samples per symbol can be achieved. Due to the cyclic sampling, the output signal is averaged and reconstructed, and noise & distortions are reduced.

In one implementation, this generalized n-phase samplers combiner processes baseband signals rather than input modulated signals like 100 or 400 do. The advantage and flexibility of this implementation provides high flexibility in terms of sampling like previously with 2 degrees of freedom for setting the number of samples per input signal symbol: 1) receive sampling clock rate vs. 2) number of N-phase receive samplers. This implementation does not produce excess jitter. To the contrary, a baseband oversampling sampler produces excess jitter that depends on the oversampling ratio and has no flexibility in term of sampling for a given number of samples per symbol. Performance is limited when the symbol rate is very high, and the sampling rate cannot be M time higher than it.

An application of this implementation may be the amplification and regeneration of digital baseband signals without generation of excess jitter at very high data rate. Another application is amplification of an attenuated and distorted input signal and generation of a combined signal such as 107 to feed a CDR with zero or low jitter. Other applications include, regeneration of a digital signal where the phase is unknown, or varying, or where the symbol rate may vary; regeneration of noisy signal with minimum excess jitter due to N-phase sampling and combining where the noise is reduced by the averaging intrinsic of the combiner (low pass filtering); or pre-equalizing in regeneration of received digital signals, etc.

Although the symbol synchronization method is used throughout with the application of EHF contactless communication, the apparatus and method configurations described in this specification can be used for any suitable communication system where receive sampler(s) are used. For example, the techniques described in this specification may be used in various applications, including for example, communication at fast to very fast data rate, medium to very high frequency, and in applications where the ratio of symbol rate vs. the carrier frequency is 0.1% or higher. This includes radio frequency from a few MHz to the THz range, for instance 433 MHz, 900 MHz, 2.4 GHz, 6 GHz, 27 GHz, 57-71 GHz, 120 GHz. Also long range radio, e.g., at 150 MHz, medical communication, e.g., at 433 MHz, ISM apps, etc. The techniques can also be used for different communication protocols where binary amplitude modulation such as OOK, ASK, SSB, DSBCS, and M-ary AM modulations such as 4-ASK are used.

Applications include Gigabit contactless communication, and Gigabit radio communication. Aside of radio communication, this invention may find great use in Gigabit fiber optic communication, in single mode and dispersion shifted fibers, high capacity optical access networks, short range optical transmission systems, optical interconnects and optical access network, Gigabit coaxial cable communication, Gigabit waveguide communication and other Gigabit wired communication.

A number of embodiments of the invention have been described. Nevertheless, it will be understood that various modifications may be made without departing from the spirit and scope of the invention. Accordingly, other embodiments are within the scope of the following claims.

In addition to the embodiments of the attached claims and the embodiments described above, the following embodiments are also innovative:

Embodiment 1 is an apparatus comprising: a plurality of receive samplers arranged in parallel and configured to receive an amplitude modulated input signal, each sampler being clocked at a same rate but not a same phase, the rate being in relation with the input signal; a plurality of envelope extractors, wherein each envelop extractor is communicatively coupled to a respective output of one of the plurality of receive samplers, and wherein each envelope extractor is configured to extract the envelope of the input signal after sampling; and a combiner communicatively coupled to the envelope extractors to combine the signal envelopes sampled at their respective phases, creating a combined output that provides an approximate copy of the input signal envelope, providing an output signal for performing symbol synchronization.

Embodiment 2 is the apparatus of embodiment 1, wherein the output of the combiner is provided to a synchronizer for performing symbol synchronization.

Embodiment 3 is the apparatus of any one of embodiments 1 through 2, wherein the receive sampler includes an amplification function.

Embodiment 4 is the apparatus of any one of embodiments 1 through 3, wherein the amplification follows at least one of following patterns: linear, exponential, quadratic, time variant, limited between a minimum and maximum magnitude, saturated, or progressively saturated.

Embodiment 5 is the apparatus of any one of embodiments 1 through 4, wherein the clock rate of each receive sampler is substantially within a few percent of the symbol rate of the input signal.

Embodiment 6 is the apparatus of any one of embodiments 1 through 5, wherein the clock rate of each receive sampler is between 2 times the symbol rate of the input signal divided by the number of receive samplers and P times this amount where P is a positive real number greater than 1.0.

Embodiment 7 is the apparatus of any one of embodiments 1 through 6, wherein the number of the plurality of receive samplers is N; and wherein: the phase of the clock rate of a first receive sampler is not delayed; the phase of the clock rate of a second receive sampler is delayed by 360 degrees divided by N relative to the first receive sampler; the phase of the clock rate of a third receive sampler is delayed by 360/N degrees relative to the second receive sampler; and the phase of the clock rate of a fourth receive sampler is delayed by 360/N degrees relative to the third receive sample, such that the phase of the clock rate of each receive sampler N is delayed by 360/N degrees relative to receive sampler (N−1).

Embodiment 8 is the apparatus of any one of embodiments 1 through 7, wherein the number of sampling points per one symbol of the input signal using the plurality of receive samplers provides the output signal having 1) no or lower excess jitter and 2) higher accuracy.

Embodiment 9 is the apparatus of any one of embodiments 1 through 8, wherein the receive samplers are super regenerative amplifiers (SRAs).

Embodiment 10 is the apparatus of any one of embodiments 1 through 9, wherein the each receive sampler is at least one amongst: a sample and hold, a track and hold, a multiplier, a mixer, a double balanced mixer, a modulator, a demodulator, a switch, a RF switch, or an analog switch.

Embodiment 11 is the apparatus of any one of embodiments 1 through 10, wherein the number of the plurality of receive samplers is three; and wherein, the phase of the clock rate of the second receive sampler is delayed by 120 degrees relative to the first receive sample, and the phase of the clock rate of the third receive sampler is delayed by 120 degrees relative to the second receive sampler.

Embodiment 12 is the apparatus of any one of embodiments 1 through 11, the apparatus further comprising one or more of the following components communicatively coupled to the combiner output: a filter, a low pass filter, an equalizer, a CTLE, a DFE, or an FFE.

Embodiment 13 is the apparatus of any one of embodiments 1 through 12, wherein the combiner adds the signal envelops in an analog fashion.

Embodiment 14 is the apparatus of any one of embodiments 1 through 13, the apparatus further comprising a sample and hold after each envelope extractor.

Embodiment 15 is the apparatus of any one of embodiments 1 through 14, wherein the sample and hold is clocked at substantially a same rate at each receive sampler.

Embodiment 16 is the apparatus of any one of embodiments 1 through 15, the apparatus further comprising a Clock-Data Recovery block (CDR) communicatively coupled to one or more of: the combiner output, a filter following the combiner, a CTLE following the combiner or filter, a DFE following the combiner or filter or CTLE, to process, synchronize and generate an output signal in phase with the information of the input signal.

Embodiment 17 is the apparatus of any one of embodiments 1 through 16, wherein the clocks of the receive samplers are derived from the CDR.

Embodiment 18 is the apparatus of any one of embodiments 1 through 17, wherein the clocks of the receive samplers are derived from a clock independent from the input signal.

Embodiment 19 is the apparatus of any one of embodiments 1 through 18, wherein the amplitude modulated input signal comprises one of the following: analog modulated, digital modulated, ASK, OOK, 3-ASK, 4-ASK, N-ASK, SSB, or DSBCS.

Embodiment 20 is the apparatus of any one of embodiments 1 through 19, wherein the amplitude modulated input signal is a binary modulation comprising one of: ASK, OOK, SSB, or DSBCS.

Embodiment 21 is the apparatus of any one of embodiments 1 through 20, the apparatus further comprising a switch configured to select between a first and a second behavioral state for the apparatus, wherein in the first switch state the clocks of the receive samplers are derived from a clock independent from the input signal and a CDR locks up to the incoming data symbols; and wherein in the second switch state, the clocks of the receive samplers are switched from a local clock to the clocks provided by a CDR, which are synchronized with the incoming data symbols.

Embodiment 22 is a method comprising: receiving a M-ary amplitude modulated signal; using a plurality of parallel receive samplers to sample the information of the received signal periodically; clocking each of the plurality of samplers at a same rate but not a same phase, wherein the rate is in relation with the input signal information; extracting the signal envelope from the output of each of the plurality of receive samplers; and combining the information of each signal, wherein the output of the combined information corresponds to a copy of the input signal envelope before sampling.

Embodiment 23 is the method of embodiment 22, wherein the receive samplers include an amplification function.

Embodiment 24 is the method of any one of embodiments 22 through 23, wherein the amplification follows at least one of following patterns: linear, exponential, quadratic, time variant, limited between a minimum and maximum magnitude, saturated, or progressively saturated.

Embodiment 25 is the method of any one of embodiments 22 through 24, wherein the sampler's clock rate is substantially within a few percent of the symbol rate of the input signal.

Embodiment 26 is the method of any one of embodiments 22 through 25, wherein the clock rate of each receive sampler samplers is between 2 times the symbol rate of the input signal divided by the number of receive samplers and P times this amount where P is a positive real number greater than 1.0.

Embodiment 27 is the method of any one of embodiments 22 through 26, wherein each of the plurality of receive samplers is a super regenerative amplifier (SRA).

Embodiment 28 is the method of any one of embodiments 22 through 27, wherein each of the receive samplers is at least one amongst: a sample and hold, a track and hold, a multiplier, a mixer, a double balanced mixer, a modulator, a demodulator, a switch, a RF switch, or an analog switch.

Embodiment 29 is the method of any one of embodiments 22 through 28, wherein the number of the plurality of receive samplers is N; and wherein: the phase of the clock rate of a first receive sampler is not delayed; the phase of the clock rate of a second receive sampler is delayed by 360 degrees divided by N relative to the first receive sampler; the phase of the clock rate of a third receive sampler is delayed by 360/N degrees relative to the second receive sampler; and the phase of the clock rate of a fourth receive sampler is delayed by 360/N degrees relative to the third receive sampler such that the phase of the clock rate of each receive sampler N is delayed by 360/N degrees relative to receive sampler (N−1).

Embodiment 30 is the method of any one of embodiments 22 through 29, wherein the number of sampling points per one symbol of the input signal using the plurality of receive samplers provides the output signal having 1) no or lower excess jitter and 2) high accuracy.

Embodiment 31 is the method of any one of embodiments 22 through 30, wherein the plurality of receive samplers is three; and wherein, the phase of the clock rate of the second receive sampler is delayed by 120 degrees relative to the first receive sampler; and the phase of the clock rate of the third receive sampler is delayed by 120 degrees relative to the second receive sampler.

Embodiment 32 is the method of any one of embodiments 22 through 31, further comprising one or more of the following components communicatively coupled after combining the information of each signal: a filter, a low pass filter, an equalizer, a CTLE, a DFE, or a FFE.

Embodiment 33 is the method of any one of embodiments 22 through 32, wherein the combining of the information of each signal is done in an analog fashion.

Embodiment 34 is the method of any one of embodiments 22 through 33, the method further comprising further comprising a sample and hold function following the extracting of the each signal envelope.

Embodiment 35 is the method of any one of embodiments 22 through 34, wherein the sample and hold function following the extracting of the each signal envelope is clocked at a similar rate as each receive sampler.

Embodiment 36 is the method of any one of embodiments 22 through 35, the method further comprising performing a Clock-Data Recovery (CDR) function following one of: combining the information of each signal, filtering the combining the information of each signal, CTLE function following the combining the information of each signal or filtering, DFE function following the combining of the information of each signal or filtering or CTLE function processing, or synchronizing and generating a signal in phase with the information of the input signal.

Embodiment 37 is the method of any one of embodiments 22 through 36, wherein clocking the receive samplers is derived from the CDR function.

Embodiment 38 is the method of any one of embodiments 22 through 37, wherein clocking the receive samplers is derived from a clocking function independent from the input signal.

Embodiment 39 is the method of any one of embodiments 22 through 38, wherein the received M-ary amplitude modulated signal comprises one of an analog modulated, digital modulated, ASK, OOK, 3-ASK, 4-ASK, N-ASK, N-AM, SSB, or DSBCS.

Embodiment 40 is the method of any one of embodiments 22 through 39, wherein receiving a binary amplitude modulated signal includes a modulation comprising ASK, OOK, SSB, or DSBCS.

Embodiment 41 is a method comprising: receiving an non-modulated input signal; using a plurality of parallel receive samplers to periodically sample the information of the received signal; clocking each of the plurality of receive samplers at a same rate but not a same phase, wherein the rate is specified in relation with the input signal information; wherein, the number of the plurality of receive samplers is N; the phase of the clock rate of a first receive sampler is not delayed; the phase of the clock rate of a second receive sampler is delayed by 360 degrees divided by N relative to the first receive sampler; the phase of the clock rate of a third receive sampler is delayed by 360/N degrees relative to the second receive sampler; and the phase of the clock rate of a fourth receive sampler is delayed by 360/N degrees relative to the third receive sampler such that the phase of the clock rate of each receive sampler N is delayed by 360/N degrees relative to receive sampler (N−1); processing the output of each of the plurality of receive samplers; combining the information of each signal to generate an output signal that corresponds to a regenerated copy of the input signal before sampling.

Embodiment 42 is the method of embodiment 41, wherein each of the receive samplers includes an amplification function.

Embodiment 43 is the method of any one of embodiments 41 through 42, wherein the amplification follows at least one of following patterns: linear, exponential, quadratic, time variant, limited between a minimum and maximum magnitude, saturated, progressively saturated.

Embodiment 44 is the method of any one of embodiments 41 through 43, wherein the clock rate of the samplers is between 2 times the symbol rate of the input signal divided by the number of receive samplers and P times this amount where P is a positive real number greater than 1.0.

Embodiment 45 is the method of any one of embodiments 41 through 44, wherein each of the receive samplers is at least one amongst: a modified SRA that starts to regenerate with a non-modulated input signal and resets, both states controlled with the sampling clock, a sample and hold, a track and hold, a multiplier, a mixer, a double balanced mixer, a modulator, a demodulator, a switch, a RF switch, an analog switch, a comparator, a difference amplifier, a flip-flop, a latch, bistable multivibrator, edge-triggered flip-flop, gated latch, a slicer, a clocked gate, or a clocked latch.

Embodiment 46 is the method of any one of embodiments 41 through 45, wherein an equalization function is communicatively coupled to the input signal and feeds the plurality of parallel receive samplers.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus comprising:
   a plurality of receive samplers arranged in parallel and configured to receive an amplitude modulated input signal, each receive sampler being clocked at a same rate but not a same phase, the rate being in relation with the amplitude modulated input signal;
   a plurality of envelope extractors, wherein each envelop extractor is communicatively coupled to a respective output of one of the plurality of receive samplers, and wherein each envelope extractor is configured to extract an envelope of the amplitude modulated input signal after sampling; and
   a combiner communicatively coupled to the plurality of envelope extractors to combine signal envelopes sampled at their respective phases, creating a combined output that provides an approximate copy of the envelope of the amplitude modulated input signal, providing an output signal for performing symbol synchronization.

2. The apparatus of claim 1, wherein the output of the combiner is provided to a synchronizer for performing symbol synchronization.

3. The apparatus of claim 1, wherein a clock rate of each receive sampler is substantially within a few percent of a symbol rate of the amplitude modulated input signal.

4. The apparatus of claim 1, wherein a clock rate of each receive sampler is between 2 times a symbol rate of the amplitude modulated input signal divided by a number of the plurality of receive samplers and P times this amount where P is a positive real number greater than 1.0.

5. The apparatus of claim 1, wherein a number of the plurality of receive samplers is N, where N is an Integer; and wherein:
   a phase of a clock rate of a first receive sampler is not delayed;
   a phase of a clock rate of a second receive sampler is delayed by 360 degrees divided by N relative to the first receive sampler;
   a phase of a clock rate of a third receive sampler is delayed by 360/N degrees relative to the second receive sampler; and
   a phase of a clock rate of a fourth receive sampler is delayed by 360/N degrees relative to the third receive sampler, such that the phase of the clock rate of each receive sampler N is delayed by 360/N degrees relative to receive sampler (N−1).

6. The apparatus of claim 5, wherein a number of sampling points per one symbol of the amplitude modulated input signal using the plurality of receive samplers provides the output signal having 1) no or lower excess jitter and 2) high accuracy.

7. The apparatus of claim 1, wherein each of the plurality of receive samplers are super regenerative amplifiers (SRAs).

8. The apparatus of claim 1, wherein the each receive sampler is at least one amongst: a sample and hold, a track and hold, a multiplier, a mixer, a double balanced mixer, a modulator, a demodulator, a switch, a RF switch, or an analog switch.

9. The apparatus of claim 1, wherein a number of the plurality of receive samplers is three; and wherein,
   a phase of a clock rate of a second receive sampler is delayed by 120 degrees relative to a first receive sampler, and
   a phase of a clock rate of a third receive sampler is delayed by 120 degrees relative to the second receive sampler.

10. The apparatus of claim 1, further comprising a Clock-Data Recovery block (CDR) communicatively coupled to one or more of: the combiner output, a filter following the combiner, a CTLE following the combiner or filter, a DFE following the combiner or filter or CTLE, to process, synchronize and generate an output signal in phase with information of the amplitude modulated input signal.

11. The apparatus of claim 10, further comprising a switch configured to select between a first and a second behavioral state for the apparatus,
   wherein in the first behavioral state, clocks of the plurality of receive samplers are derived from a clock independent from the amplitude modulated input signal and the CDR locks up to incoming data symbols in the amplitude modulated input signal; and
   wherein in the second behavioral state, the clocks of the plurality of receive samplers are switched from a local clock to clocks provided by the CDR, which are synchronized with the incoming data symbols.

12. A method comprising:
   receiving a M-ary amplitude modulated signal;
   using a plurality of parallel receive samplers to sample information of the received M-ary amplitude modulated signal periodically;
   clocking each of the plurality of parallel receive samplers at a same rate but not a same phase, wherein the rate is in relation with the information in the received M-ary amplitude modulated signal;
   extracting a signal envelope from an output of each of the plurality of parallel receive samplers; and
   combining information from each extracted signal envelope,
   wherein an output of the combined information corresponds to a copy of an envelope of the received M-ary amplitude modulated signal before sampling.

13. The method of claim 12, wherein the output is provided to a synchronizer for performing symbol synchronization.

14. The method of claim 12, wherein a clock rate of each of the plurality of parallel receive samplers is substantially within a few percent of a symbol rate of the M-ary amplitude modulated signal.

15. The method of claim 12, wherein a clock rate of each receive sampler of the plurality of parallel receive samplers is between 2 times a symbol rate of the M-ary amplitude modulated signal divided by a number of receive samplers and P times this amount where P is a positive real number greater than 1.0.

16. The method of claim 12, wherein each of the plurality of parallel receive samplers is at least one amongst: a sample and hold, a track and hold, a multiplier, a mixer, a double balanced mixer, a modulator, a demodulator, a switch, a RF switch, or an analog switch.

17. The method of claim 12, wherein a number of the plurality of parallel receive samplers is N, where N is an integer; and wherein:
- a phase of a clock rate of a first receive sampler is not delayed;
- a phase of a clock rate of a second receive sampler is delayed by 360 degrees divided by N relative to the first receive sampler;
- a phase of a clock rate of a third receive sampler is delayed by 360/N degrees relative to the second receive sampler; and
- a phase of a clock rate of a fourth receive sampler is delayed by 360/N degrees relative to the third receive sampler such that the phase of the clock rate of each receive sampler N is delayed by 360/N degrees relative to receive sampler (N−1).

18. The method of claim 12, wherein a number of sampling points per one symbol of the input signal using the plurality of parallel receive samplers provides the output signal having 1) no or lower excess jitter and 2) high accuracy.

19. The method of claim 12, wherein the plurality of parallel receive samplers is three; and wherein,
- a phase of a clock rate of a second receive sampler is delayed by 120 degrees relative to a first receive sampler; and
- a phase of a clock rate of a third receive sampler is delayed by 120 degrees relative to the second receive sampler.

20. The method of claim 12, further comprising performing a Clock-Data Recovery (CDR) function following one of: the combining information of each signal, filtering the combined information of each signal, a CTLE function following the combining the information of each signal or filtering, a DFE function following the combining of the information of each signal or filtering or CTLE function processing, or synchronizing and generating a signal in phase with the information of the M-ary amplitude modulated signal.

* * * * *